US011630037B2

(12) United States Patent
Occhipinti et al.

(10) Patent No.: US 11,630,037 B2
(45) Date of Patent: Apr. 18, 2023

(54) PARTICULATE MATTER DETECTION

(71) Applicant: Cambridge Enterprise Limited, Cambridge (GB)

(72) Inventors: Luigi Occhipinti, Cambridge (GB); Pelumi Oluwasanya, Cambridge (GB)

(73) Assignee: CambAir Ltd, Cambridge (GB)

( * ) Notice: Subject to any disclaimer, the term of this patent is extended or adjusted under 35 U.S.C. 154(b) by 499 days.

(21) Appl. No.: 16/644,846

(22) PCT Filed: Sep. 18, 2018

(86) PCT No.: PCT/EP2018/075234
§ 371 (c)(1),
(2) Date: Mar. 5, 2020

(87) PCT Pub. No.: WO2019/053289
PCT Pub. Date: Mar. 21, 2019

(65) Prior Publication Data
US 2020/0284710 A1    Sep. 10, 2020

(30) Foreign Application Priority Data

Sep. 18, 2017  (GB) ..................... 1715014

(51) Int. Cl.
*G01N 1/22* (2006.01)
*B01D 49/02* (2006.01)
(Continued)

(52) U.S. Cl.
CPC ........... *G01N 1/2202* (2013.01); *B01D 49/02* (2013.01); *G01N 1/2247* (2013.01);
(Continued)

(58) Field of Classification Search
CPC ............... G01N 1/2202; G01N 1/2247; G01N 15/0255; G01N 15/0266; G01N 15/0272;
(Continued)

(56) References Cited

U.S. PATENT DOCUMENTS

| 2007/0039463 A1* | 2/2007 | Desmet ............. B01L 3/502761 |
| | | 95/45 |
| 2013/0036793 A1 | 2/2013 | White et al. |
| 2018/0056228 A1* | 3/2018 | Kelly ..................... G01N 15/06 |

FOREIGN PATENT DOCUMENTS

| WO | WO 2016/156035 | 10/2016 |
| WO | WO 2016/198321 | 12/2016 |

* cited by examiner

*Primary Examiner* — Benjamin R Schmitt
(74) *Attorney, Agent, or Firm* — Rudy J. Ng; Bozicevic, Field & Francis LLP

(57) ABSTRACT

A particle sensing device is disclosed for sensing particles entrained in a gas, distribution of particle sizes including a first size range (e.g. PM2.5) and a second size range (e.g. PM10), larger than the first size range. A thermophoretic impulse is applied to the entrained particles. The device has a a first sensor, downstream of the thermophoretic impulse region. The thermophoretic impulse, the flow of gas and gravity combine to cause at least some of the particles to follow respective trajectories within the sampling volume. An interception unit is interposed between the thermophoretic impulse region and the first sensor, to intercept the respective trajectories of particles of the second size range but not respective trajectories of particles of the first size range. The first sensor is located to intercept and detect the respective trajectories of particles of the first size range.

21 Claims, 28 Drawing Sheets

(51) Int. Cl.
    *G01N 15/02*           (2006.01)
    *G01N 15/06*           (2006.01)
    *G01N 15/00*           (2006.01)

(52) U.S. Cl.
    CPC ..... *G01N 15/0255* (2013.01); *G01N 15/0266* (2013.01); *G01N 15/0272* (2013.01); *G01N 15/0656* (2013.01); *G01N 2015/0046* (2013.01); *G01N 2015/0288* (2013.01)

(58) Field of Classification Search
    CPC ....... G01N 15/0656; G01N 2015/0046; G01N 2015/0288; B01D 49/02
    See application file for complete search history.

PARTICULATE MATTER DETECTION

BACKGROUND TO THE INVENTION

Field of the Invention

The present invention relates to the detection of particulate matter, such as airborne particles.

Related Art

In the context of environmental air quality and air pollution, airborne particles are referred to as "particulate matter", often abbreviated to "PM". PM takes the form of droplets, particles and/or biological materials. PM with an aerodynamic diameter smaller than 10 µm is referred to as PM10. PM with an aerodynamic diameter smaller than 2.5 µm is referred to as PM2.5. PM2.5 is associated with poor visibility and various health problems such as cardiovascular diseases. This is considered to be so because PM2.5 can penetrate deep into the body including lungs and blood due to their small size. This may be a factor in the cause of millions of premature deaths per year [Seaton et al (1995); Kumar et al (2015)]. In view of this, PM has been given increasing attention in recent times by governments and regulatory agencies.

PM typically comprises sulfates (from the oxidation of $SO_2$), nitrates (from the oxidation of $NO_2$ and $NH_4NO_3$), ammonium and chloride salts, carbon (elemental and organic), crustal materials such as soil dusts, biological materials such as bacteria and pollen, and trace elements such as metals. A study in Beijing, for example, found that most PM observed were products of nucleation and growth processes of aerosols [Guo et al (2014)].

PM emission sources have also been classified as primary (direct emission) or secondary (such as gas-solid condensation) based on the generation process [Guo et al (2014)]. It is considered that air pollution is spatially heterogeneous. Therefore, monitoring of air quality is difficult to achieve with only a small number of localised measurements. It is in principle possible to make some assessment of air quality using satellite measurements, but systems to achieve this are exceptionally complex and expensive to deploy and maintain.

Various known techniques can be deployed to detect and/or identify PM constituents. Suitable techniques include Energy Dispersive X-Ray Fluorescence (ED-XRF) [Marcazzan et al (2001)] Aerosol Mass Spectrometer (AMS), photometer (for black carbon for example) [Guo et al (2014)] or inductively coupled plasma atomic emission spectroscopy (ICP-AES) after digestion in bulk acid, or capillary electrophoresis and FIA-colorimetry of leached particles [Querol et al (2001)]. Various techniques for the mass spectrometry of aerosols are set out in Suess and Prather (1999). Typically, known techniques for PM measurement are either bulky, complex, expensive, or, in the case of techniques adopted in portable systems, slow and/or lacking sensitivity. Also, the latter suffer from a strong need of calibration as the resulting devices may have significant deviation from unit to unit.

WO 2016/198321 discloses a particle sensing system and corresponding method for detecting particles in a fluid flow. In the system, a flow of gas with entrained particles is allowed to flow above a heating plate. Opposed to the heating plate is a series of sensor elements. The particles are subjected to a thermophoresis effect due to the heat supplied by the heating plate. The disclosure in WO 2016/198321 explains that the combination of the series of sensor elements and the thermophoresis effect means that smaller particles reach the sensor elements upstream in the series, and larger particles, if they reach a sensor element at all, reach the sensor elements downstream in the series. This forms the basis of a particle size distribution sensitivity in the system of WO 2016/198321.

Carminati et al (2014) discloses an approach to detection of PM using capacitive sensing. The approach used is to detect the increase in capacitance of a dielectric medium (air) between two charged electrodes when a particle flows between them. There are two main arrangement choices for the electrodes: parallel or coplanar. The parallel plates option presents a simpler analysis of the field encountered by the particles but is harder to realise because the size limits the inter-electrode spacing, and clogging is harder to prevent. The coplanar option circumvents these problems and is also easier to fabricate but requires a more complex field analysis as the particle can no longer be assumed to cross a uniform electric field as it flows over the plates. Carminati et al (2014) discloses the detection of PM10 and the present inventors consider that the method disclosed in Carminati et al (2014) cannot detect PM2.5.

SUMMARY OF THE INVENTION

The present inventors have realised that the approach taken in WO 2016/198321 is susceptible of improvement. In particular, it is doubtful whether the arrangement of sensor elements in WO 2016/198321 provides adequate particle size distribution sensitivity. This is because the system would allow a relatively large particle to reach the sensor elements upstream in the series if the particle is already close to the sensor elements in the flow path. Moreover, in the arrangement of the disclosure WO 2016/198321 all sensor elements are exposed to the flow of both large and small size particles, which makes the system unable to distinguish the effect of smaller particles only, particularly the one of particles smaller than 2.5 microns (PM2.5). This would give rise to a detection event that would be mis-classified and/or to a wrong statistical determination of the concentration of PM2.5 present in air, on the basis of the disclosure in WO 2016/198321.

The present invention has been devised in order to address at least one of the above problems. Preferably, the present invention reduces, ameliorates, avoids or overcomes at least one of the above problems.

Accordingly, in a first preferred aspect, the present invention provides a particle sensing device for sensing particles entrained in a gas, the particle sensing device comprising:

a sampling volume through which gas having entrained particles with a distribution of particle sizes including a first size range and a second size range, larger than or smaller than the first size range, is to be flowed;

a thermophoretic impulse region arranged to apply a thermophoretic impulse to the entrained particles;

a first sensing region, downstream of the thermophoretic impulse region, the first sensing region having a first sensor, wherein, in operation, the thermophoretic impulse, the flow of gas and gravity combine to cause at least some of the particles to follow respective trajectories within the sampling volume, the particle sensing device further comprising:

an interception region, interposed between the thermophoretic impulse region and the first sensing region, the interception region having an interception unit located to intercept the respective trajectories of particles of the second size range but not respective trajectories of particles of the first size range, wherein the first sensor element is located to intercept the respective trajectories of particles of the first size range and to detect particles of the first size range.

Accordingly, in the distribution of particle sizes including the first size range and the second size range, the second size range is different to the first size range.

In some embodiments, in the distribution of particle sizes, the second size range is larger than the first size range. In other embodiments, in the distribution of particle sizes, the second size range is smaller than the first size range.

In a second preferred aspect, the present invention provides a method of sensing particles entrained in a gas, the method including the steps:

flowing gas having entrained particles with a distribution of particle sizes including a first size range and a second size range, larger than or smaller than the first size range, through a sampling volume;

applying a thermophoretic impulse to the entrained particles at a thermophoretic impulse region so that the thermophoretic impulse, the flow of gas and gravity combine to cause at least some of the particles to follow respective trajectories within the sampling volume;

detecting particles of the first size range at a first sensor element located to intercept the respective trajectories of particles of the first size range at a first sensing region, downstream of the thermophoretic impulse region; and intercepting the respective trajectories of particles of the second size range but not respective trajectories of particles of the first size range at an interception unit located in an interception region, interposed between the thermophoretic impulse region and the first sensing region.

The first and/or second aspect of the invention may have any one or, to the extent that they are compatible, any combination of the following optional features or the optional features set out above. Furthermore, additional optional features are set out in the dependent claims.

Preferably, in operation, the thermophoretic impulse, the flow of gas and gravity combine to cause at least some of the particles to follow respective curved trajectories each having an apogee within the sampling volume. As will be understood, the thermophoretic impulse can be provided by a heater or similar. As the gas is heated by the heater, a thermophoretic force is applied to the particles suspended in the gas. A thermophoretic force applied over a time interval (i.e. the time interval for which the gas flows over the heater) corresponds to a thermophoretic impulse.

Preferably, the first sensor is adapted to detect PM2.5. In other embodiments, the first sensor may be adapted to detect PM10. The first sensor may sense the particles by capacitive detection. The first sensor may have an arrangement of coplanar interdigitated electrodes.

In operation, the interception unit typically shadows the first sensor from particles of the second size range. The interception unit may be oriented substantially perpendicular to the direction of gas flow. The direction of the gas flow may be assessed as the direction of gas flow at the inlet and/or at the outlet. The interception unit typically has a planar format. In this case, the direction of gas flow may be perpendicular to the plane of the interception unit (i.e. substantially parallel to the normal from the plane).

In some embodiments, the interception unit may comprise a second sensor, capable of sensing the particles of the second size range. For example, the second sensor may be adapted to detect PM10. In other embodiments, the second sensor may be adapted to detect PM2.5. The second sensor may sense the particles by capacitive detection. The second sensor may have an arrangement of coplanar interdigitated electrodes.

The first sensor is preferably oriented substantially perpendicular to the direction of gas flow. The direction of the gas flow may be assessed as the direction of gas flow at the inlet and/or at the outlet. The first sensor typically has a planar format. In this case, the direction of gas flow may be perpendicular to the plane of the first sensor (i.e. substantially parallel to the normal from the plane).

The thermophoretic impulse region is preferably provided with a heater. Suitable heaters include electrical resistance heaters. The heater may have a substantially planar format. In some embodiments, the orientation of the heater may be substantially parallel to the direction of gas flow (assessed as the direction of gas flow typically at the inlet). In some other embodiments, the orientation of the heater may be substantially perpendicular to the direction of gas flow.

When the device is held upright, the sampling volume may be defined between a lower surface and an upper surface, the device further comprising an inlet to guide the gas flow into the sampling volume, the inlet being located:

(i) closer to the lower surface than the upper surface of the sampling volume;

(ii) through the lower surface; or (iii) through the upper surface.

In the case of (i), the device preferably further comprises an outlet for the gas flow to exit the sampling volume, the outlet being located further from the lower surface than the inlet is located from the lower surface.

In the case of (ii), the device preferably further comprises an outlet for the gas flow to exit the sampling volume, the outlet also being located through the lower surface.

In the case of (iii), the device preferably further comprises an outlet for the gas flow to exit the sampling volume, the outlet also being located through the upper surface.

The sampling volume may have a volume of at most 40000 $mm^3$. However, in some embodiments, the sampling volume may have a volume substantially smaller than this, e.g. at most 10000 $mm^3$, at most 1000 $mm^3$, at most 100 $mm^3$, at most 10 $mm^3$, or at most 1 $mm^3$.

The particle sensing device may be formed by a MEMS-based fabrication process. As will be understood, MEMS literally stands for "Micro-Electro-Mechanical System". It is acknowledged that the devices of the preferred embodiments have no electro-mechanical moving parts and so strictly speaking are not MEMS devices. Nevertheless, we refer here to "MEMS-based" in relation to the fabrication and integration process adopted for the manufacture of the devices. For example, silicon micromachining and wafer-to-wafer bonding are typically adopted in MEMS front-end and back-end fabrication processes and are also of significant interest in the manufacture of devices according to preferred embodiments of the present invention.

Particularly, but not exclusively, for a MEMS-based device, it is of interest to ensure suitable thermal management of the device. This is a significant issue where the device is a small scale device. Where the thermophoretic impulse region is provided with a heater, preferably the heater is formed on a beam suspended across the sampling volume. The suspension of the beam in this way limits the thermal losses of the heater, allowing the heater to operate at suitable temperatures without over-heating the device or drawings too much power. The formation of suitable beams using MEMS-based processes is technically achievable.

Similarly, it is possible for the first sensor and/or second sensor to be formed on respective beams suspended across the sampling volume.

Further optional features of the invention are set out below.

BRIEF DESCRIPTION OF THE DRAWINGS

Embodiments of the invention will now be described by way of example with reference to the accompanying drawings in which.

Figure 1:
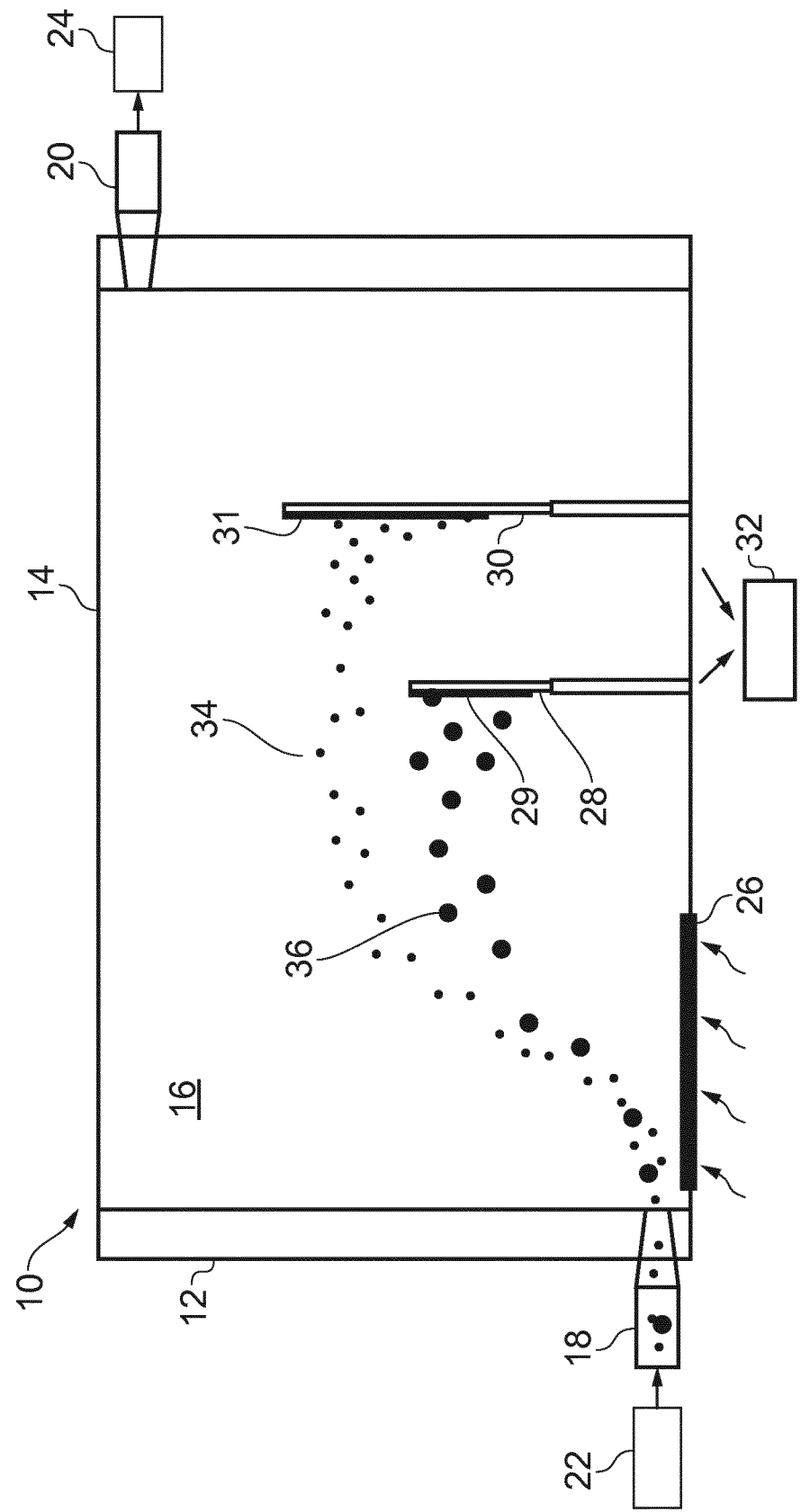
FIG. 1 shows a schematic longitudinal cross-sectional view of a particle sensing device according to an embodiment of the invention.

DETAILED DESCRIPTION OF THE PREFERRED EMBODIMENTS, AND FURTHER OPTIONAL FEATURES OF THE INVENTION

The preferred embodiments of the present invention use thermophoresis to cause differential effects on entrained particles of different sizes in a gas flow. The principle of operation can be understood from a consideration of FIG. 1, which shows a schematic longitudinal cross-sectional view of a particle sensing device 10 according to an embodiment of the invention.

Particle sensing device 10 has a housing 12 which may, for example, be formed by a known 3D printing process which is not described further here. Housing 12 and top cover 14 together form a chamber 16 which defines a sampling volume. An inlet 18 is formed towards the base of housing 12 at one end of chamber 16 and an outlet 20 is formed towards the top of housing 12 at the other end of chamber 16. Gas is supplied to inlet 18 via inlet pump 22. Gas is extracted from the outlet 20 via outlet pump 24.

In view of the location of the inlet and the outlet, there is defined a flow direction for gas longitudinally (or generally longitudinally) along the chamber 16.

Heater 26 is located at the floor of the chamber, adjacent inlet 18. PM10 sensor 28 and PM2.5 sensor 30 are located downstream of heater 26. PM10 sensor 28 and PM2.5 sensor 30 are controlled and powered by electronics, shown generally at 32.

PM10 sensor 28 and PM2.5 sensor 30 have an arrangement of coplanar interdigitated electrodes 29, 31 suitable for sensing the arrival of particulate matter (PM) by the arriving PM affecting the capacitance between the coplanar interdigitated electrodes. The electrodes 29, 31 are shown in schematic cross-sectional view.

The gas includes entrained particles. The gas may, for example, be ambient air, with the sensing device deployed to sense the concentration of PM in the ambient air. As can be seen from the schematic view of FIG. 1, the gas includes entrained particles with a distribution of particle sizes including particles 34 of a first size range and particles 36 of a second size range, larger than the first size range.

For clarity, the schematic view of FIG. 1 shows a bimodal particle size distribution. It will be understood that PM may be present in the gas in a broader range of particle sizes, depending on many environmental factors. However, the principle of operation of the present invention applies similarly to such broader ranges of particle sizes.

On operation of the heater 26 incoming gas is heated. This, in effect, provides a thermophoretic impulse to the entrained particles, the impulse ending once the flow of gas takes the entrained particles out of reach of the effect of the heater 24. Due to the thermophoresis effect, particles of smaller size (e.g. particles 34) move away from the heater, and therefore rise, faster than particles of larger size (e.g. 36). The effect of this is that the thermophoretic impulse, the flow of gas and gravity combine to cause particles 34 and 36 to follow respective different trajectories within the sampling volume 16. The spatial distribution of particles 34 and 36 is shown in FIG. 1 also to take account of exemplary statistical variations.

PM2.5 sensor 30 is located at a first sensing region, downstream of the thermophoretic impulse region (heater 24).

PM10 sensor 28 is located at an interception region, which is interposed between the thermophoretic impulse region and the first sensing region. In effect, PM10 sensor 28 is an interception unit which is located to intercept the respective trajectories of particles 36 but not respective trajectories of particles 34 (i.e. the smaller particles). It can be noted that the height of PM10 sensor 28 is smaller in this embodiment than the height of PM2.5 sensor 30.

Thus, the PM2.5 sensor 30 is located to intercept the respective trajectories of particles of the first size range and to detect particles of the first size range. PM10 sensor 28 is located to intercept the respective trajectories of particles of the second size range. In this embodiment, additionally, PM10 sensor 28 is capable of detecting particles of the second size range.

It will be understood that a simpler embodiment can be envisaged, in which the PM10 sensor 28 can be replaced by a simple shield, whose role is only to block, or shadow, the second particles 36 from reaching the PM2.5 sensor 30. Blocking the second particles 36 from reaching the PM2.5 sensor 30 provides the advantage of reducing or avoiding the mis-characterization of PM10 particles reaching the PM2.5 sensor 30 as PM2.5. This is needed because the capacitive technique for sensing the arrival of PM at the PM2.5 sensor 30 is not necessarily capable of discriminating between PM2.5 and PM10. Therefore, the preferred embodiments of the invention use the thermophoresis effect and interception in order to provide suitable discrimination between PM2.5 and PM10.

The additional benefit of providing the PM10 sensor 28 as a sensor is that the device then allows the generation of a PM10 measurement from the gas. Note that electrodes 29 are spaced above the floor of the chamber 16 in order that PM10 sensor 28 receives PM10, which is also the subject of a thermophoresis effect, in preference to still larger particulates for which the thermoelectric impulse will not be sufficient to raise those larger particles in the gas flow to reach electrodes 29.

The thermophoretic impulse, the flow of gas and gravity combine to cause at least some of the particles to follow respective curved trajectories each having an apogee within the sampling volume. With such an effect, the arrangement of the sensors 28, 30 can provide a particularly suitable effect in terms of discrimination between PM10 and PM2.5, for example.

Each of sensors 28, 30 is oriented substantially perpendicular to the direction of gas flow, in order to ensure the provision of a suitable effect in terms of shielding and/or sensing.

In preferred embodiments of the invention, the length (in the flow direction of the gas) of the chamber 16 is a few mm, e.g. at least 1 mm, and preferably not more than 40 mm. This is significantly larger than the MEMS embodiments discussed below.

The linear flow rate of gas through the chamber 16 is preferably about 0.02 ms$^{-1}$. Other suitable flow rates may be used depending on the application.

In this embodiment, the heater 24 heats the flowing gas to a temperature of at most 90° C. Other suitable temperatures may be used depending on the application. The MEMS embodiments discussed below may use higher temperatures.

Figure 2:
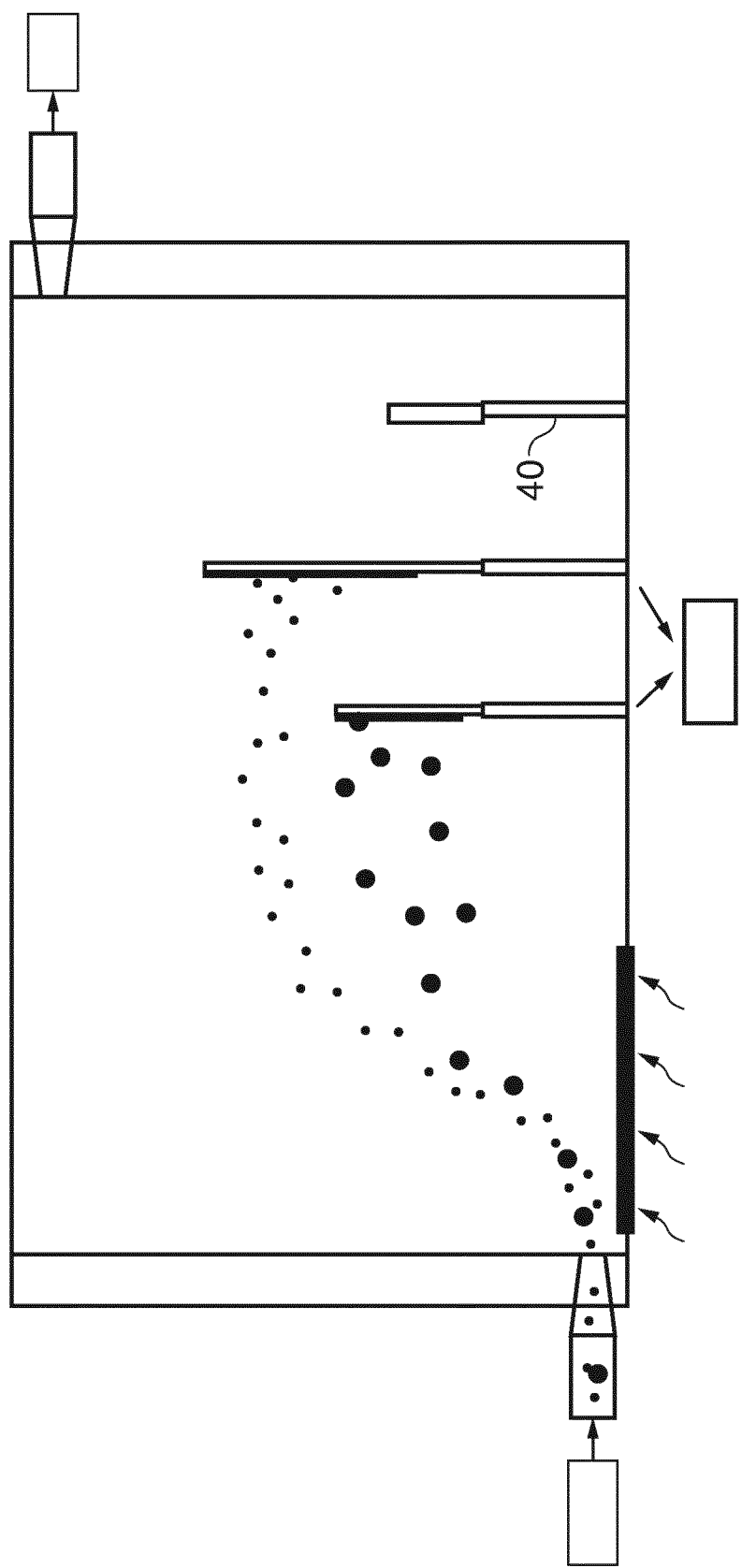
FIG. 2 shows a schematic longitudinal cross-sectional view of a particle sensing device according to another embodiment of the invention.

FIG. 2 shows a schematic longitudinal cross sectional view of a particle sensing device according to another embodiment of the invention. This is the same as the embodiment of FIG. 1, with the exception of the inclusion of pressure, temperature and humidity (PTH) sensors and sensor unit 40, which provides additional data relevant to the measurement of PM. Other features, where there are the same as the embodiment of FIG. 1, are not described or identified with reference numbers again.

Figure 3:
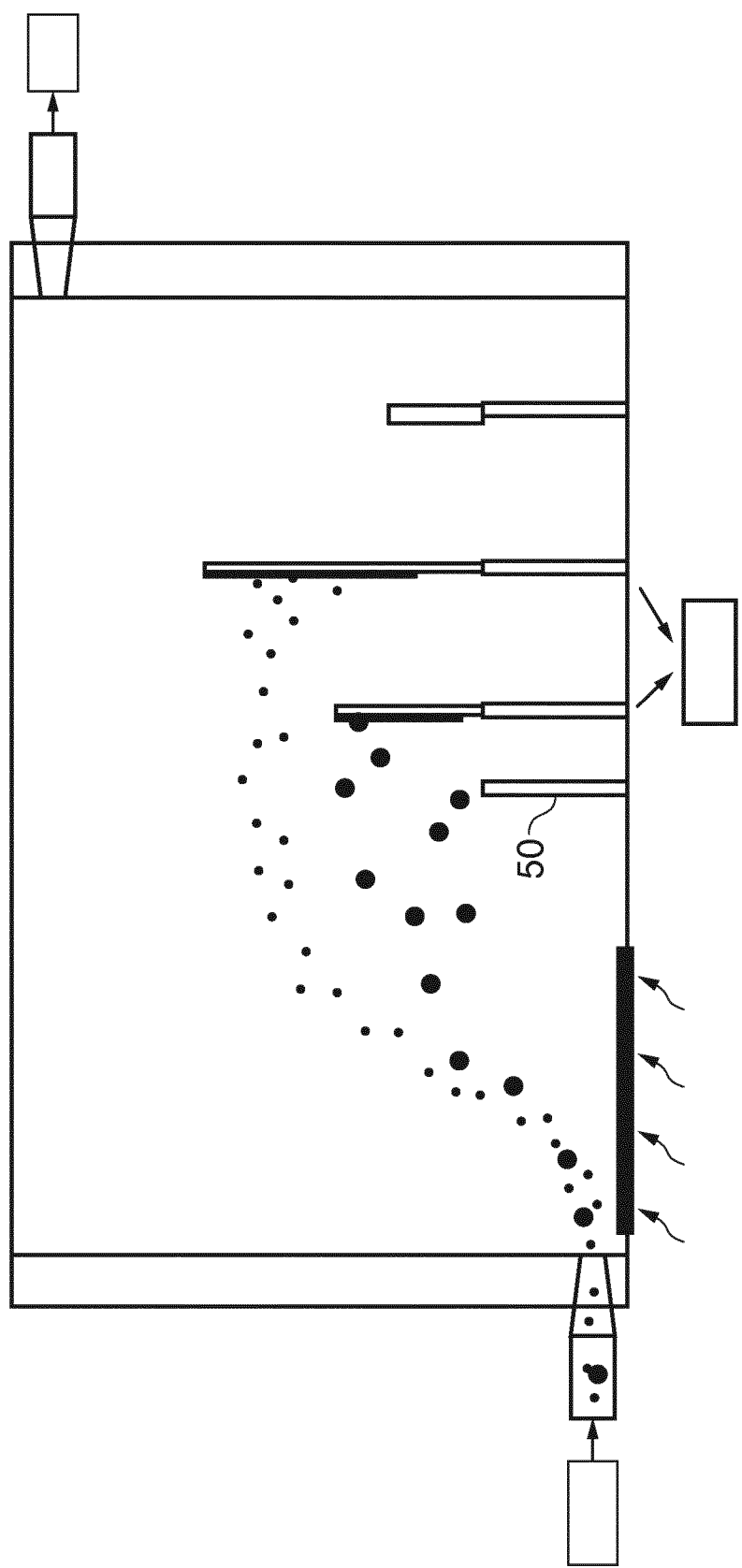
FIG. 3 shows a schematic longitudinal cross-sectional view of a particle sensing device according to a further embodiment of the invention.

FIG. 3 shows a schematic longitudinal cross-sectional view of a particle sensing device according to a further embodiment of the invention. This is the same as the embodiment of FIG. 2, with the exception of the inclusion of additional barrier 50. Barrier 50 provide an additional shadowing effect, to reduce the probability of PM larger than PM10 from reaching PM10 sensor 28. Other features, where there are the same as the embodiments of FIGS. 1 and/or 2, are not described or identified with reference numbers again.

Figure 4:
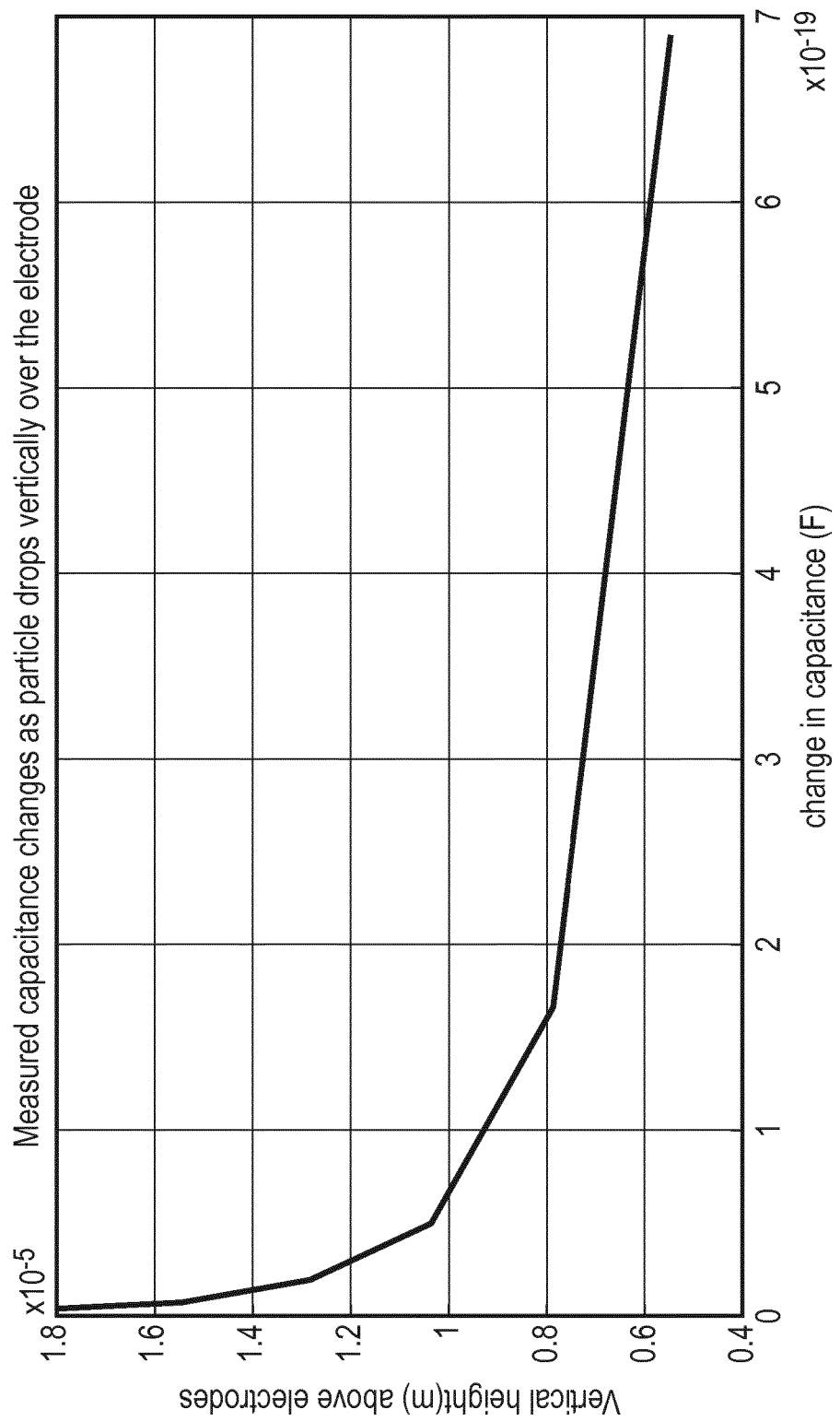
FIG. 4 shows the results of numerical simulations of the change of capacitance at a sensing electrode structure for use with an embodiment of the invention, the change in capacitance being due to a change in vertical height of a particle over the electrode structure.

FIG. 4 shows the results of numerical simulations of the change of capacitance at a sensing electrode structure for use with an embodiment of the invention, the change in capacitance being due to a change in vertical height of a particle over the electrode structure.

Figure 5:
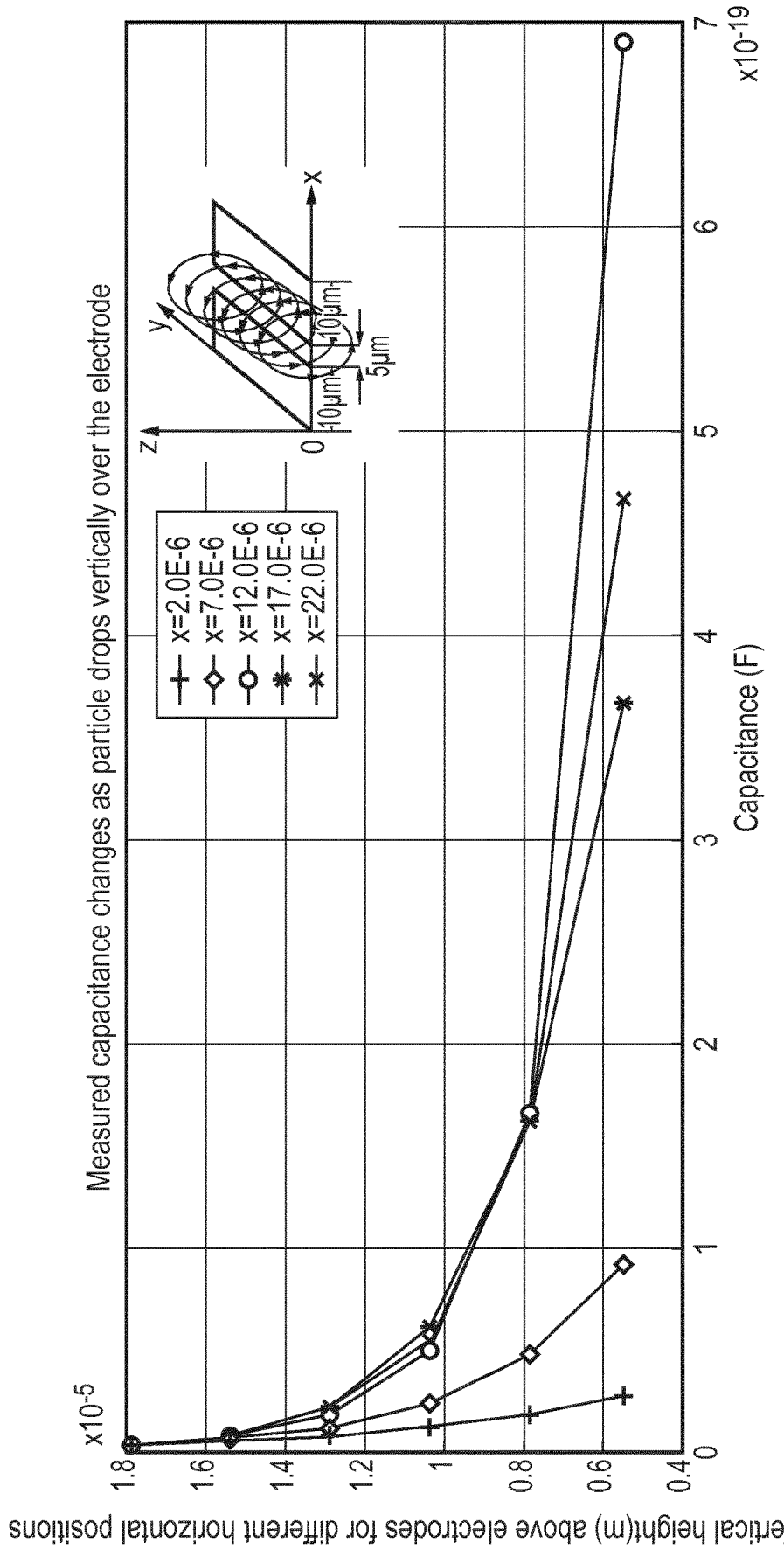
FIG. 5 shows a corresponding graph to FIG. 4 for particles at different horizontal positions with respect to the electrode structure.

FIG. 5 shows a corresponding graph to FIG. 4 for particles at different horizontal positions with respect to the electrode structure. The inset of FIG. 5 indicates the separation between the different interdigitated electrodes at the sensor. The simulation shows the effect of the particle being at different positions along the x-axis, which as shown in the inset of FIG. 5 corresponds to the particle traversing across the gap between the electrodes. When the particle is at the gap between the electrodes, the measured signal (change in capacitance) is greatest.

As will be understood, the embodiments of the invention seek to address some limitations in PM detection using capacitive techniques according to the literature. Where the electrodes for capacitive sensing are co-planar, it is advantageous to reduce the inter-electrode spacing. This increases the measured signal amplitude. In terms of the associated electronics for the detector, it is preferred to reduce noise as far as practicable and to increase the sensitivity. A few techniques for Zepto Farad detection have been suggested in the literature, such as in Carminati et al (2011) and Carminati et al (2010). The techniques proposed by Yu et al (2016) can additionally be used. Suitable inter-digitated electrodes configurations can be analysed in terms of their field patterns using conformal mapping corresponding to the approach used by Chen et al (2004).

Additional modifications of the device and/or its operation will now be set out.

There may be provided a pre-filtering stage for removing larger particles, e.g. PM bigger than 10 μm. This pre-filter may be provided in the chamber 16, at inlet 18, or upstream of inlet 18.

It is possible to use slanted or curved sensing surfaces/electrodes.

There may be provided one or more coating on the sensor/electrodes. This may provide additional functionality, such allowing for adherence of the PM to the sensor, or preventing adherence of the PM to the sensor. As will be understood, the sensor may operate based on particle deposition on the sensor or just collision with the sensor surface.

Provision may be made for a secondary gas flow in the chamber. This allows for particle removal and/or sensor cleaning.

The device may be operable to be heated to allow sensor surface regeneration. In practice, this may require heating of the sensor surface to high enough temperature to allow combustion of the PM.

The device may form part of a multi-sensor suite. For example, there may be provided a reference sensor, typically having a similar or identical architecture but not exposed to PM. The device may therefore be operated in single mode or differential mode for the detection of PM.

The electrodes may be fabricated on any suitable substrate such as silicon, glass, polymer, or any other rigid, flexible or conformable substrate. In operation, the electrodes may be driven using a DC or AC voltage source of any suitable waveform/frequency. The electrodes may be arranged as capacitor/impedance-based sensor.

The preferred embodiments of the invention may be used for monitoring of the outdoor environment, and/or may be used for monitoring indoor environments and enclosed spaces such as buildings and/or vehicles.

Further embodiments of the invention will now be described.

The embodiments described above can be manufactured by 3D printing of the housing and installation of a PCB including the heater, PM2.5 sensor and the PM10 sensor, with connections to the required power supply and associated control and measurement electronics.

The heater may be controlled using a linear voltage regulator such as a LM317LDG. The LM317LDG provides for current limiting, and allows the heater and temperature sensor to be combined and connected to an Arduino (open-source electronic prototyping platform), for example, for controlling the temperature.

The inventors have realised that the present invention may be embodied in a further miniaturised version compared with the embodiments described above. Suitable embodiments may be manufactured using a MEMS fabrication process. Specifically, the device may be manufactured using silicon processing technology. This takes advantage of the benefits of silicon such as higher compatibility with heat (e.g. temperatures above 550K). Certain possible problems with miniaturisation and the use of silicon are addressed. Such problems include the thermal conductivity of silicon, which results in heat loss. This is addressed using a suspended heater, for example, and explained in more detail below. Miniaturisation to MEMS scale provides the possibility to integrate devices according to the embodiments of the invention into smart systems, smart devices and/or wearables and also utilise the already well-established fab capabilities available. Such advantages are not provided by polyimide and 3D printing processing routes.

Figure 6:
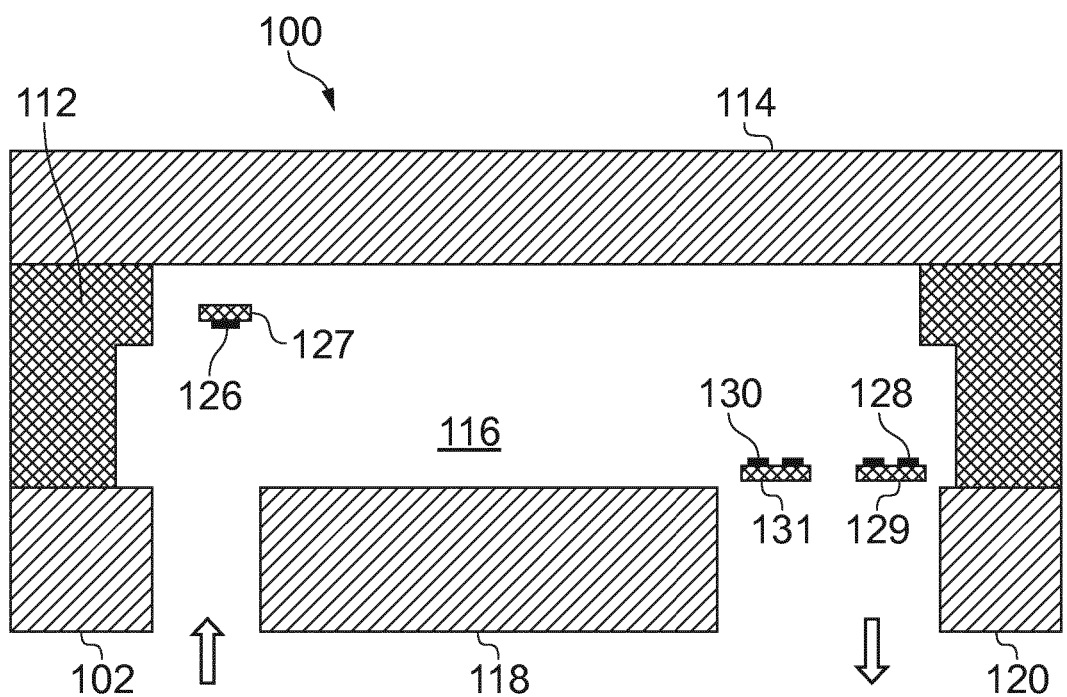
FIG. 6 shows a vertical plane longitudinal cross sectional view through a MEMS-based particle sensing device according to an embodiment of the invention.

FIG. 6 shows a vertical plane longitudinal cross-sectional view through a MEMS-based particle sensing device 100 according to an embodiment of the invention. Bottom wafer 102 provides gas flow inlet 118 and gas flow outlet 120. The device has sidewalls 112 and cover wafer 114, together with the bottom wafer 102 defining a chamber 116. Gas is supplied to inlet 118 via and inlet pump (not shown). Gas is extracted from the outlet 120 via an outlet pump (not shown).

In view of the location of the inlet 118 and the outlet 120, there is defined a flow direction for gas longitudinally (or generally longitudinally) along the chamber 116.

Heater 126 is located on a suspended heater beam 127, above inlet 118. PM2.5 sensor 130 is located on a suspended beam 131 downstream of the heater. PM10 sensor 128 is located on a suspended beam 129 downstream of the PM2.5 sensor. In the drawing, PM10 sensor 128 and PM2.5 sensor 130 are located above the outlet 120.

Figure 7:
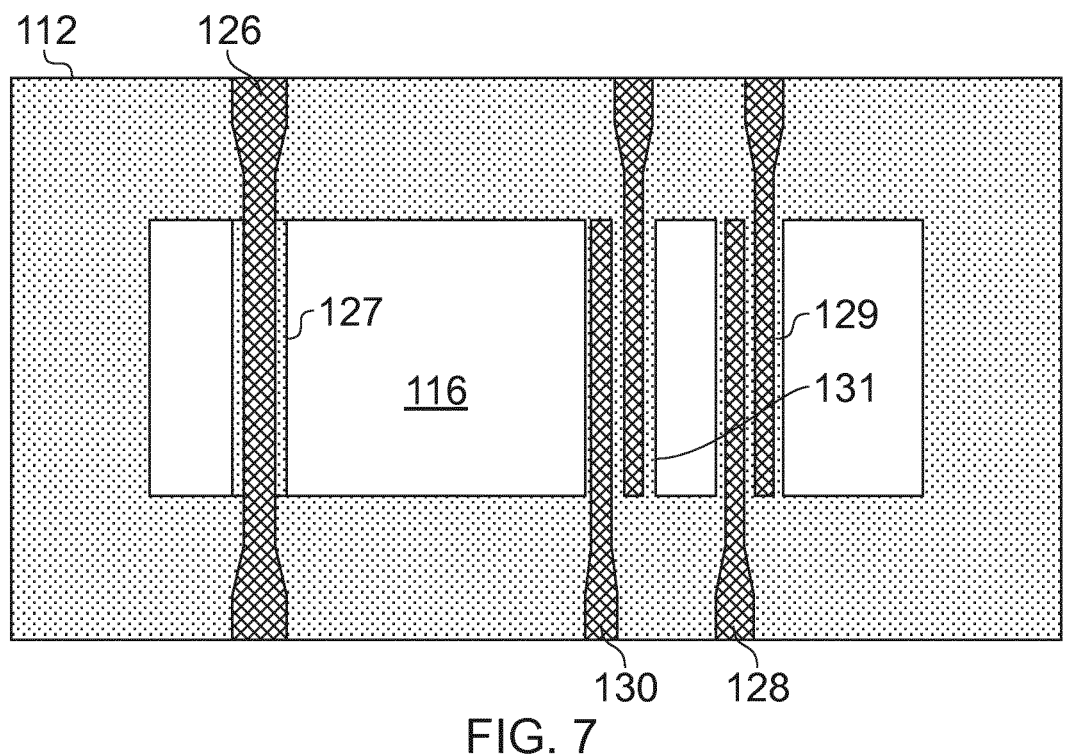
FIG. 7 shows the device of FIG. 6 but in a horizontal plane longitudinal cross section.

FIG. 7 shows the device of FIG. 6 but in a horizontal plane longitudinal cross section. through the side walls 112 and showing the beams 127, 129 and 131 and the heater 126 and PM10 sensor 128 and PM2.5 sensor 130 respectively formed on the beams. The PM sensors have an arrangement of coplanar interdigitated electrodes (shown only schematically but similar in operating principles to the embodiments shown in FIGS. 1-3). The PM sensors are suitable for sensing the arrival of particulate matter (PM) by the arriving PM affecting the capacitance between the coplanar inter-digitated electrodes.

The bottom wafer device has typical dimensions of 0.6 mm×0.6 mm and is conveniently integrated in a silicon wafer containing a plurality of devices. The heater 126 is located closer to the top wafer 114 than the bottom wafer 102. There is a pressure difference between the inlet 118 and outlet 120 which allows for a laminar flow along streamlines from inlet to outlet. The particles are also subject to drag force as well as gravity. Also because of the laminar flow, there is a pressure gradient in the sensor that also attempts to pull/push (depending on flow direction) particles through inertia forces. As would be expected, after thermophoretic force impact, the larger particles (PM10) show lower deviation and are deposited further along in the device.

The embodiment shown in FIGS. 6 and 7 is an upward flow option. In this embodiment, particles flow against gravity and thus require less thermophoretic force to separate them into desired directions, hence lower heating is needed.

Figure 8:
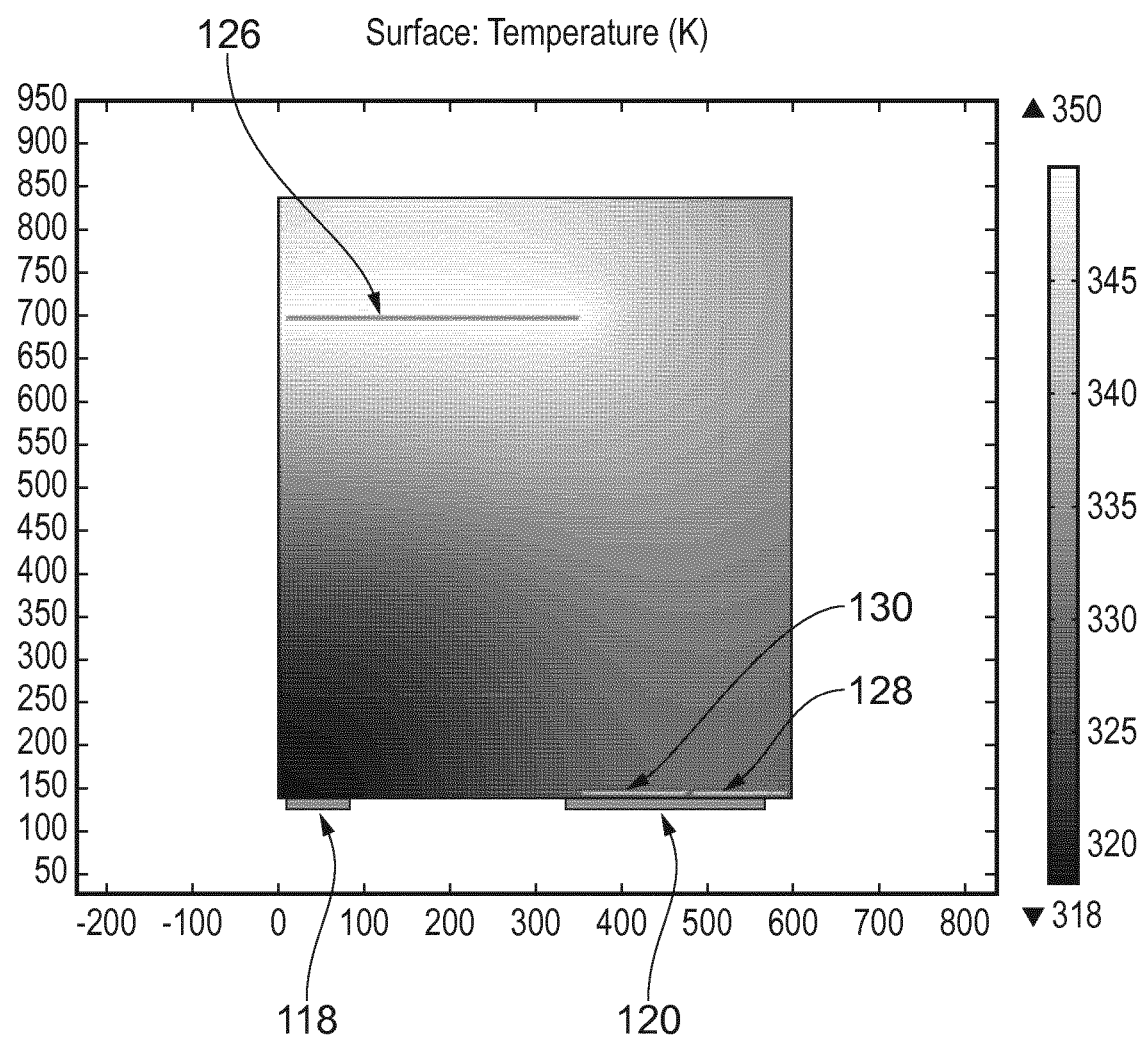
FIG. 8 illustrates a modelled temperature distribution for the upward flow option shown in FIGS. 6 and 7.

FIG. 8 illustrates a modelled temperature distribution for the upward flow option shown in FIGS. 6 and 7. This distribution shows the surface temperature variation in the device. Note that the relative scale in different directions is different in FIG. 8 compared with FIGS. 6 and 7.

Figure 9:
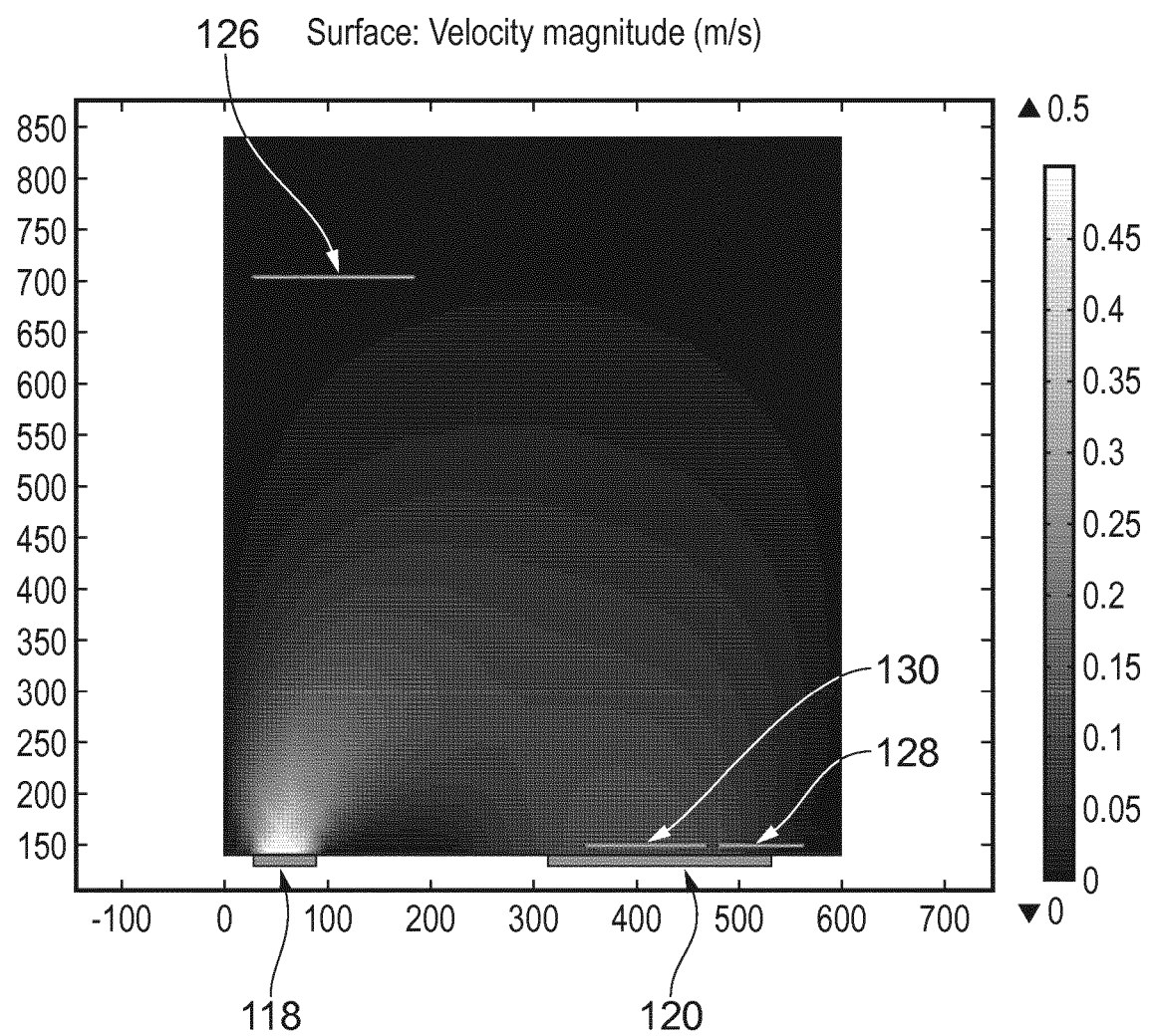
FIG. 9 shows a modelled velocity profile of carrier airflow through the device of FIG. 8.

FIG. 9 shows a modelled velocity profile of carrier airflow through the device of FIG. 8. It can be immediately seen the deceleration of the flow upwards from the inlet and the acceleration downwards towards the outlet upon the thermophoretic impulse from the heater.

In the embodiment of FIGS. 6-9, it is found that suitable operation and discrimination between PM10 and PM2.5 can be achieved when operating the device with a heater temperature of 350K or lower.

Figure 10:
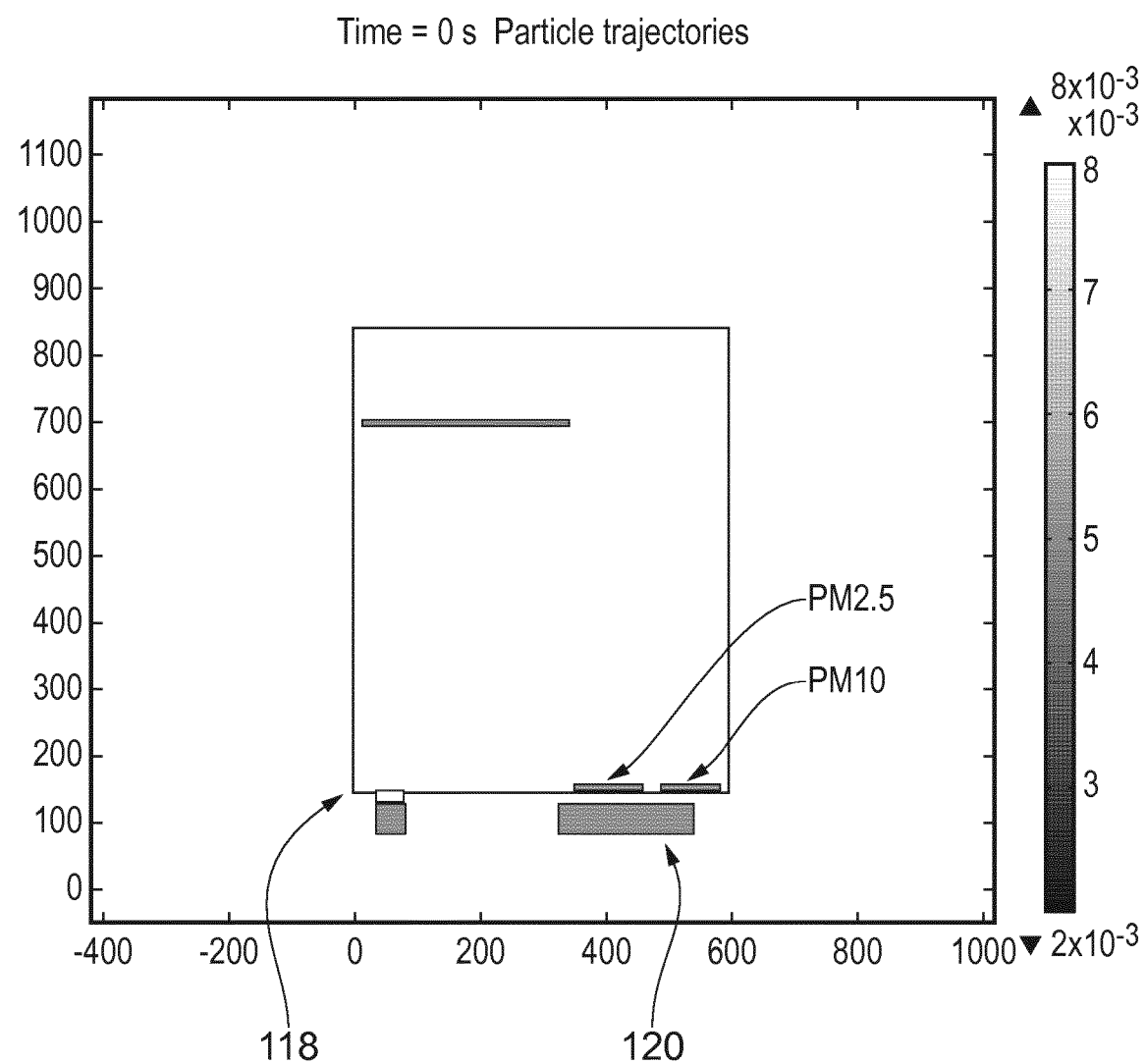
FIGS. 10-13 show particle trajectories for the device of FIGS. 6-9.
Figure 11:
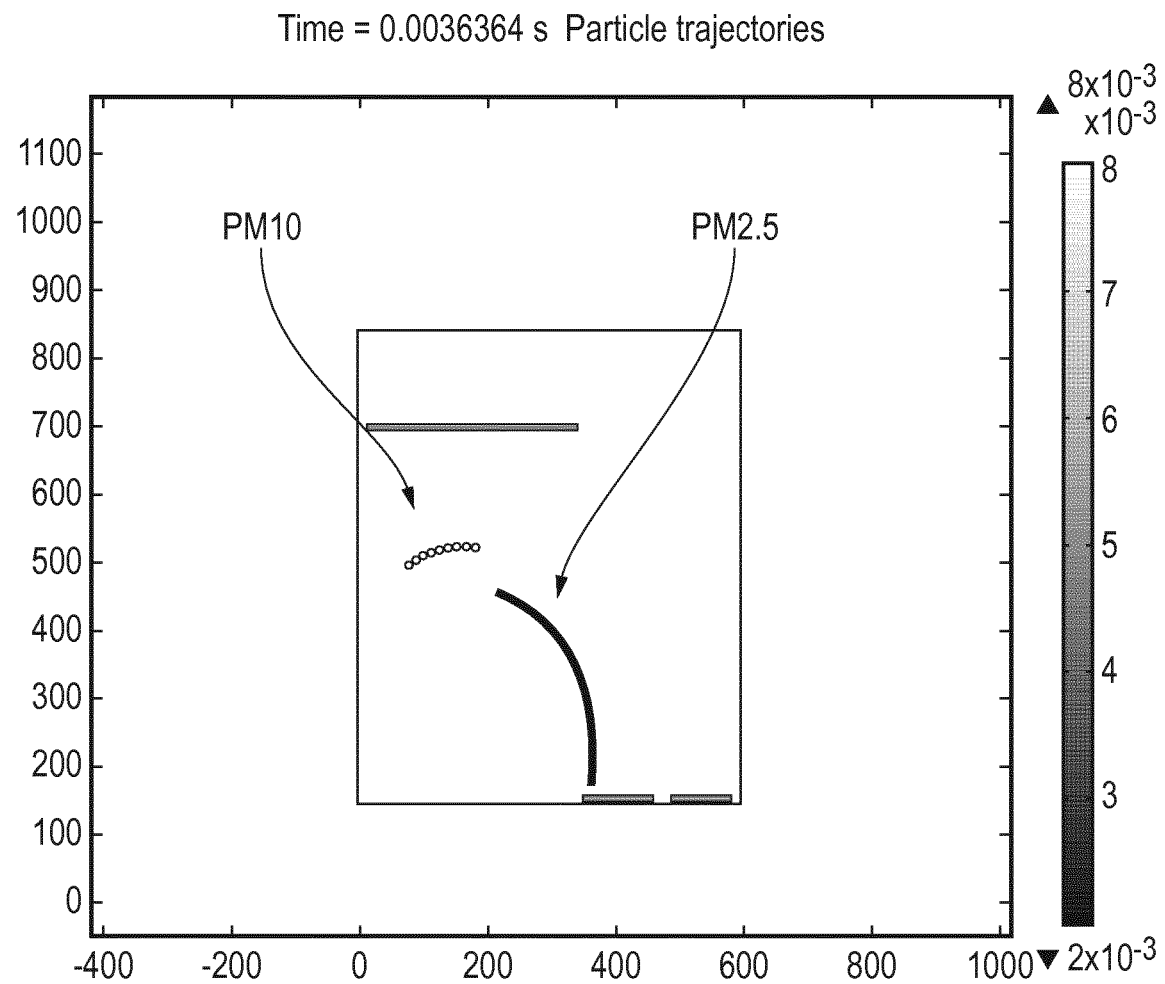
Figure 12:
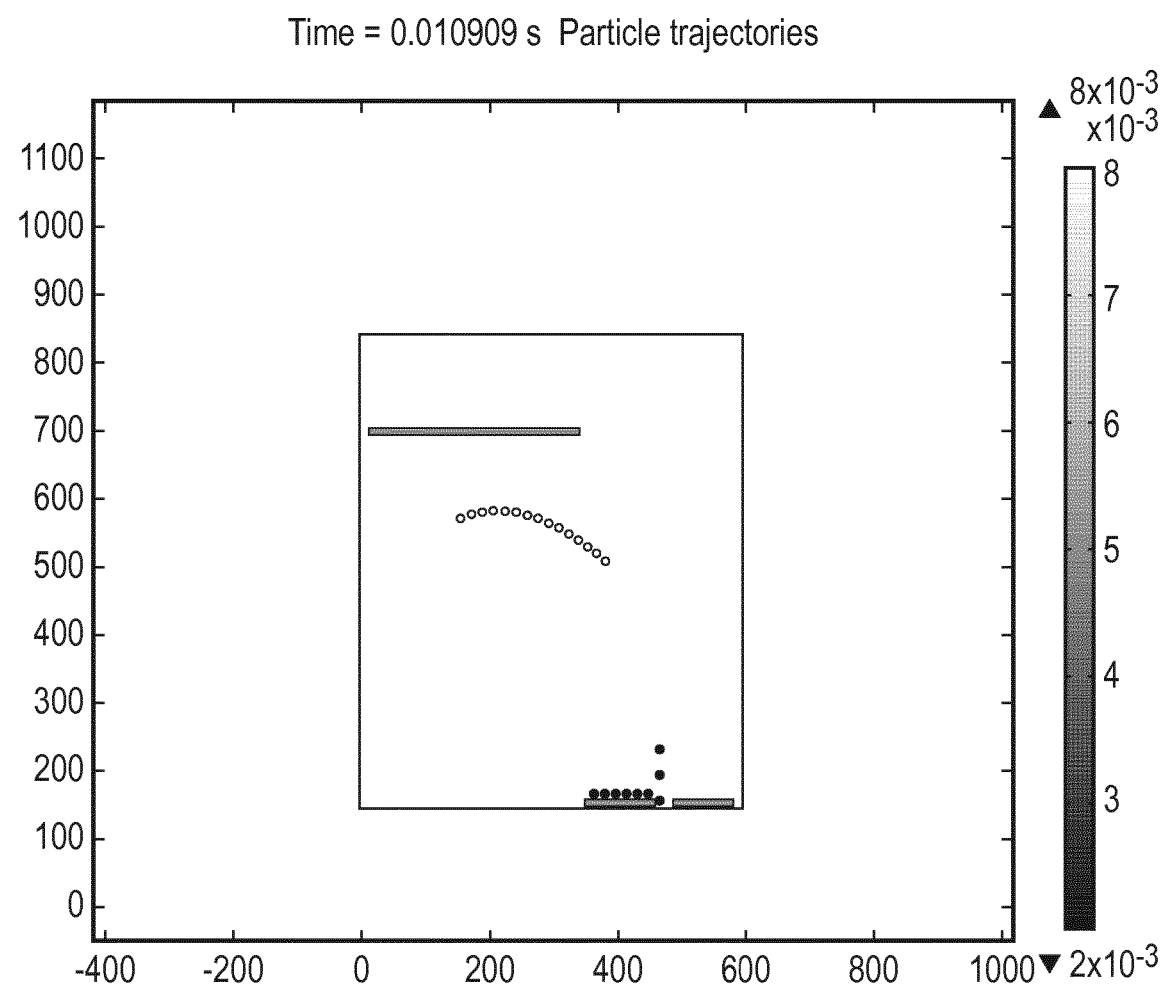
Figure 13:
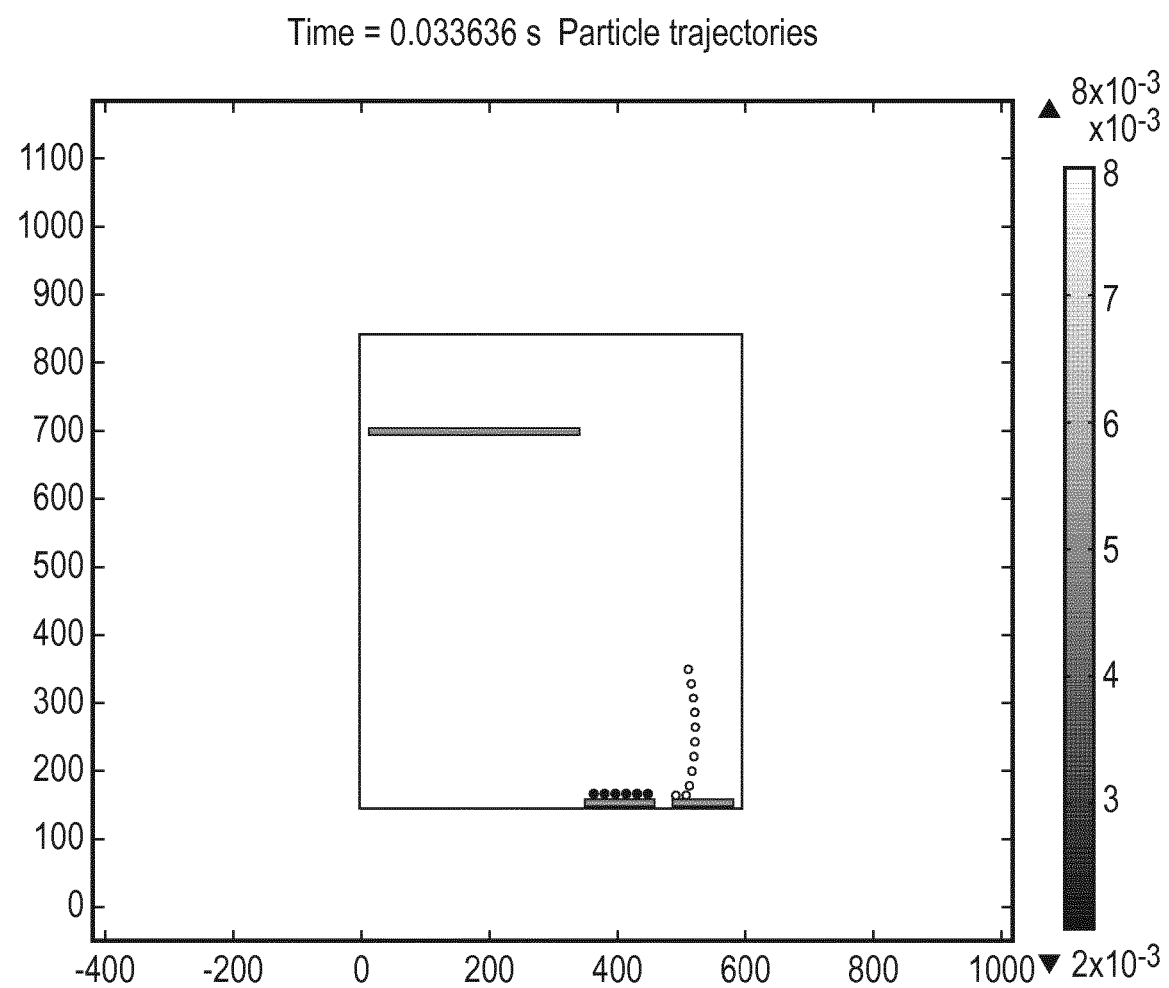

The particle trajectories for the device of FIGS. 6-9 are shown in FIGS. 10-13. What is illustrated are the modelled trajectories of a sequence of PM2.5 particles (black) introduced in a gas flow flowing into the inlet 118. Subsequently, a sequence of PM10 particles (white) is introduced in the gas flow flowing into the inlet 118. FIG. 10 shows the device at time t=0. FIGS. 11, 12 and 13 show subsequent times. As can be seen, the PM2.5 particles are deflected more than the PM10 particles. The PM2.5 particles therefore are intercepted by the PM2.5 sensor, which is upstream of the PM10 sensor.

The embodiment is therefore different to the embodiments of FIGS. 1-3, in that the intercepted particles are the PM2.5 particles. However, the operating principle of the embodiment is the same, in that the thermophoretic effect is used to deviate the trajectories of the PM2.5 particles more than the PM10 particles.

FIGS. 14-17 show steps in a fabrication process for the embodiment of FIGS. 6-9.

Figure 14:
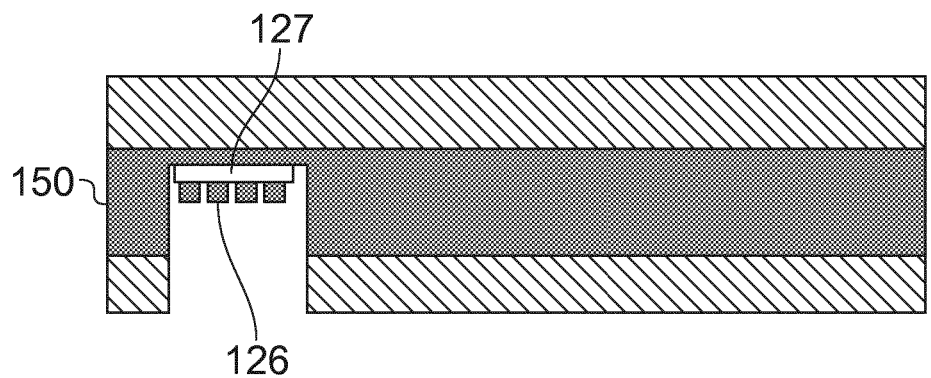
FIGS. 14-17 show steps in a fabrication process for the embodiment of FIGS. 6-9.

In FIG. 14, a silicon wafer 150 is subjected to $SiO_2$ deposition, patterning and etching. A Si etch is carried out in order to form a trench. LSN (low stress nitride) deposition is carried out in the trench and then Ti/Au/Pt/PLY (PLY is polysilicon) metallization and patterning via photolithography are performed in order to form the heater and associated beam.

Figure 15:
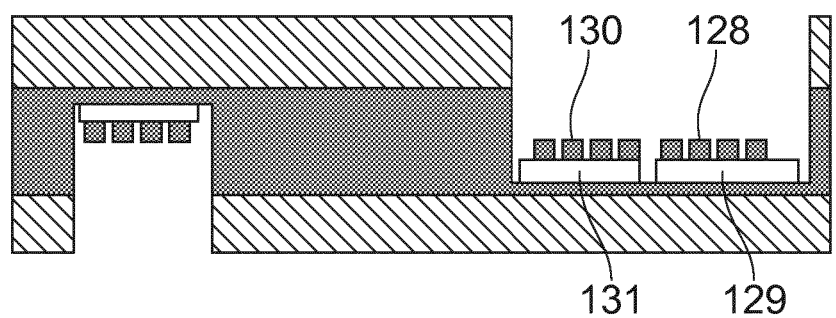

In FIG. 15, similar steps as in FIG. 14 are carried out in order to form the sensor electrodes on their respective beams.

Figure 16:
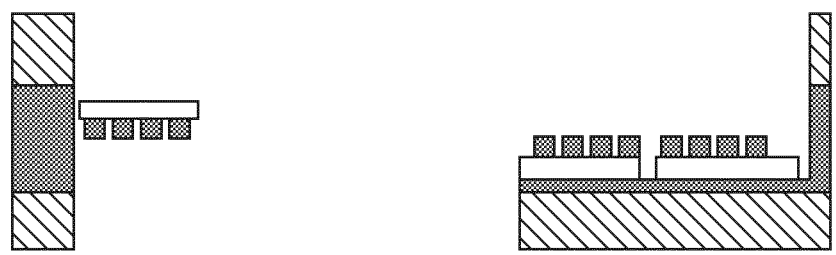

In FIG. 16, $SiO_2$ patterning and etching is carried out, in addition to a Si and LSN etch in order to release the heater and sensors.

Figure 17:
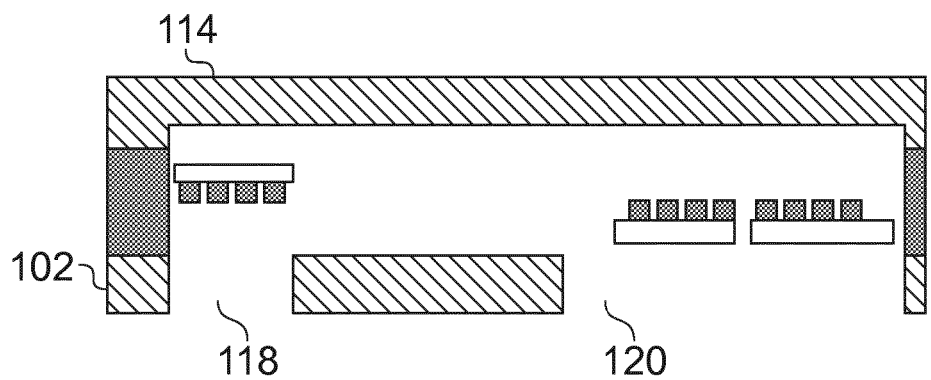

In FIG. 17, bottom wafer and top wafer are bonded in order to enclose the chamber and form the device, the bottom wafer incorporating the inlet 118 and outlet 120. When the silicon wafers are designed to integrate conveniently a plurality of devices, the bonding of bottom and top wafers allows the enclosure of the chambers and form the plurality of devices at the same time. The devices can then be singulated at a later stage with known methods, such as by silicon die cutting methods. This also applies to the embodiments described below. As will be understood, in practice, a wafer has a much larger size than a single device, and therefore a plurality of the same devices are fabricated at the same time, both for the bottom and the top wafers. These are aligned and bonded together, as described. Then the single devices are obtained from the bonded wafers by die cutting methods, e.g. by mechanical sawing.

Figure 18:
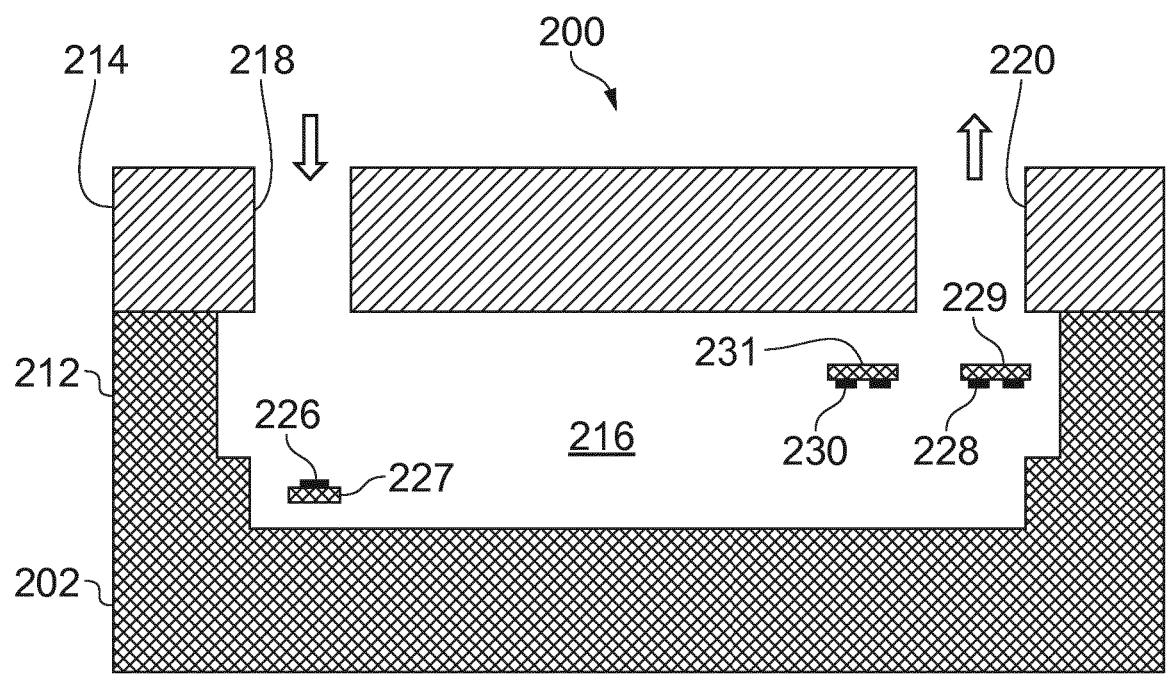
FIG. 18 shows a vertical plane longitudinal cross sectional view through a MEMS-based particle sensing device according to another embodiment of the invention.

FIG. 18 shows a vertical plane longitudinal cross-sectional view through a MEMS-based particle sensing device 200 according to another embodiment of the invention. As will be noted, this is in effect a re-oriented version of the embodiment shown in FIG. 6. Top wafer 214 provides gas flow inlet 218 and gas flow outlet 220. The device has sidewalls 212 and bottom wafer 202, together with the top wafer 214 defining a chamber 216. Gas is supplied to inlet 218 via and inlet pump (not shown). Gas is extracted from the outlet 220 via an outlet pump (not shown).

In view of the location of the inlet 218 and the outlet 220, there is defined a flow direction for gas longitudinally (or generally longitudinally) along the chamber 216.

Heater 226 is located on a suspended heater beam 227, below inlet 218. PM2.5 sensor 230 is located on a suspended beam 231 downstream of the heater. PM10 sensor 228 is located on a suspended beam 229 downstream of the PM2.5 sensor. In the drawing, PM10 sensor 228 and PM2.5 sensor 230 are located beneath the outlet 220.

The device has typical dimensions of 0.6 mm×0.6 mm. A plurality of devices are conveniently embedded in a silicon wafer through MEMS-based fabrication techniques. As will be understood, a typical silicon wafer may have diameter of e.g. 2", 4", 6", 8", 12" and thicknesses from 725 micron down to 100 micron (after thinning). Accordingly, it is suitable to manufacture an array of devices on a wafer using a repetitive pattern in order to obtain a plurality of devices at the same time.

The heater 226 is located closer to the bottom wafer 202 than the top wafer 214. There is a pressure difference between the inlet 218 and outlet 220 which allows for a laminar flow along streamlines from inlet to outlet. The particles are also subject to drag force as well as gravity. Also because of the laminar flow, there is a pressure gradient in the sensor that also attempts to pull/push (depending on flow direction) particles through inertia forces. As would be expected, after thermophoretic force impact, the larger particles (PM10) show lower deviation and are deposited further along in the device.

The embodiment shown in FIG. 18 is a downward flow option. In this embodiment, particles flow with gravity and thus require greater thermophoretic force to separate them into desired directions. Significant heating is therefore needed.

Figure 19:
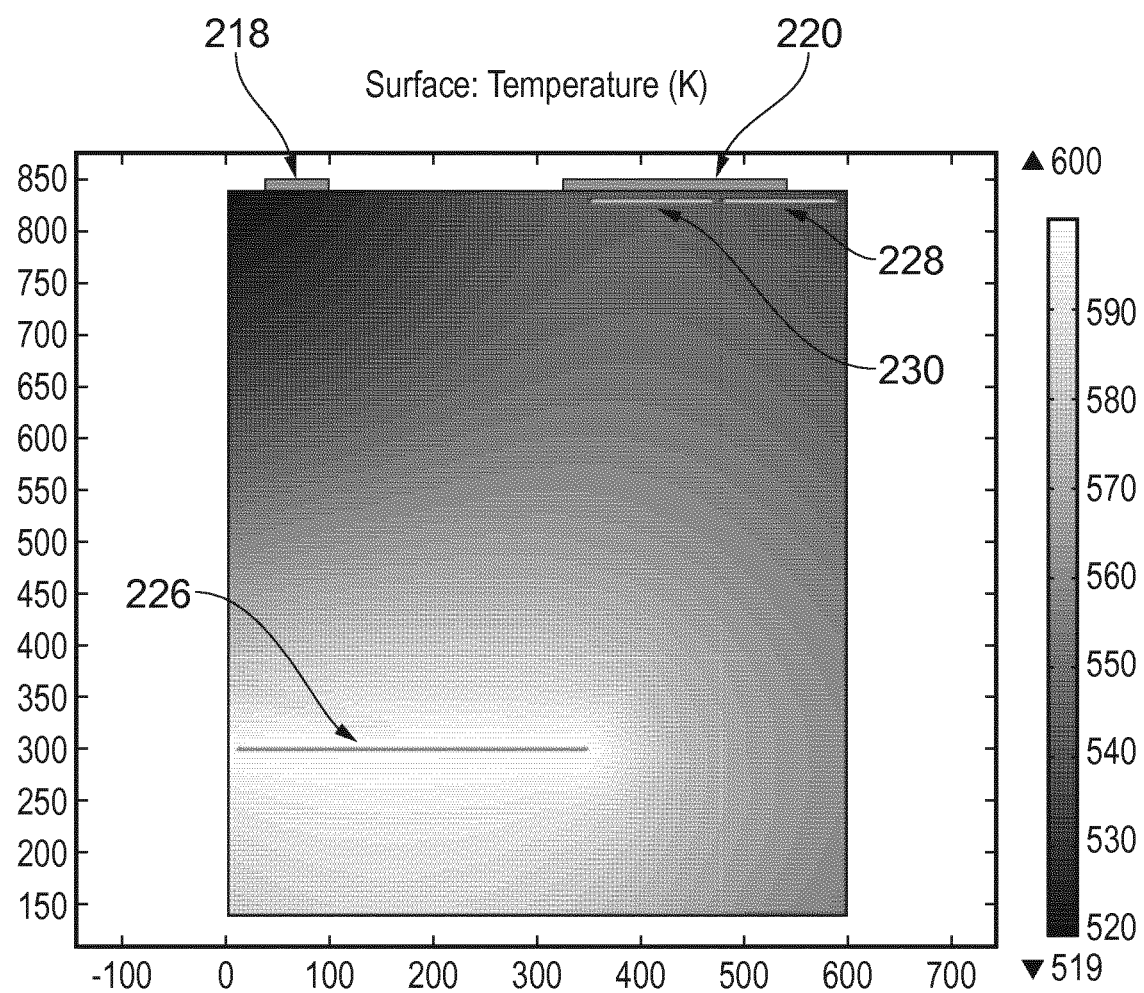
FIG. 19 illustrates a modelled temperature distribution for the down flow option shown in FIG. 18.

FIG. 19 illustrates a modelled temperature distribution for the down flow option shown in FIG. 18. This distribution shows the surface temperature variation in the device. Note that the relative scale in different directions is different in FIG. 19 compared with FIG. 18.

Figure 20:
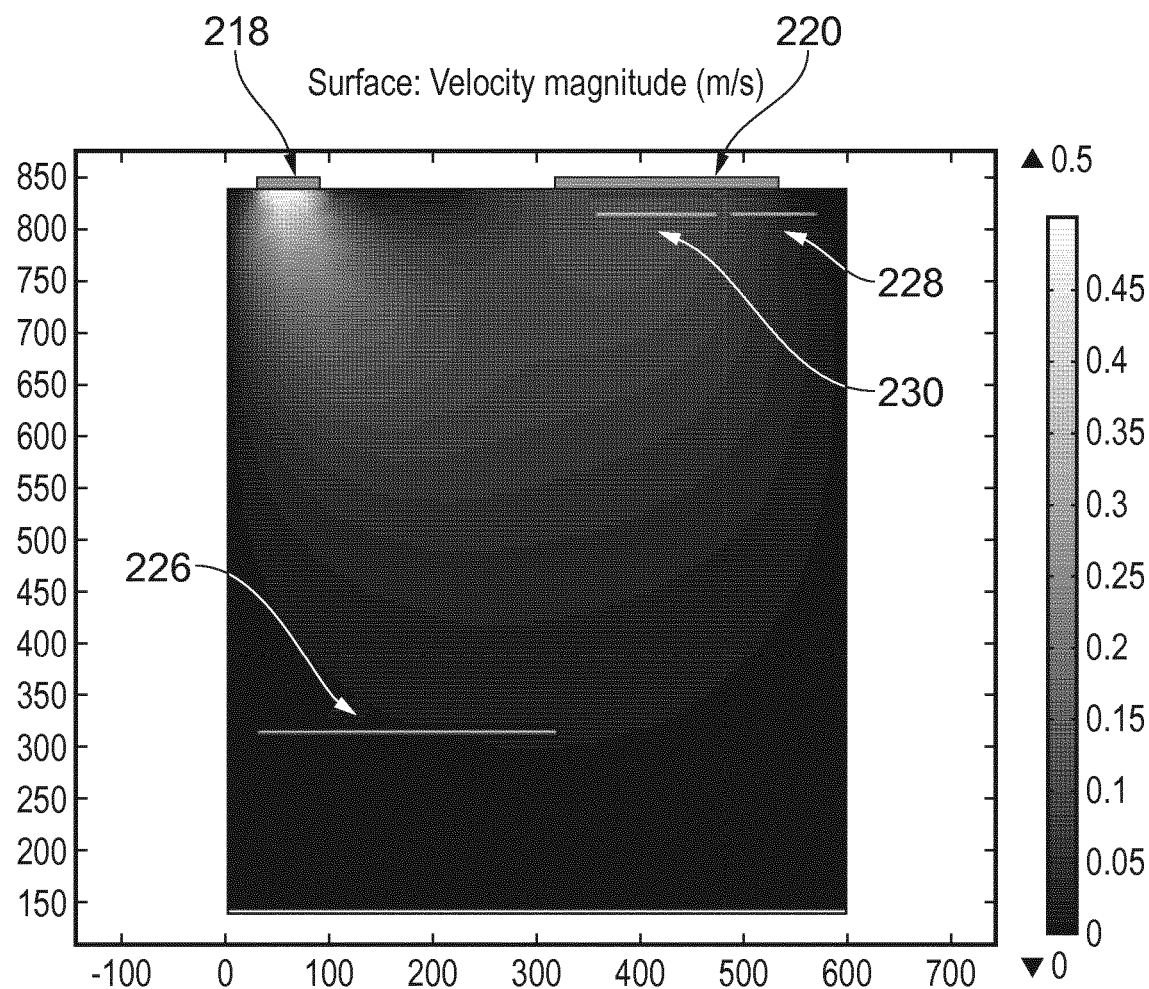
FIG. 20 shows a modelled velocity profile of carrier airflow through the device of FIG. 19.

FIG. 20 shows a modelled velocity profile of carrier airflow through the device of FIG. 19.

In this option, a marked increase in temperature gradient required for desired collection is seen in the surface temperature shown in FIG. 19. Hence, this option requires more power for its operation, for example with operating temperature up to 600K.

Figure 21:
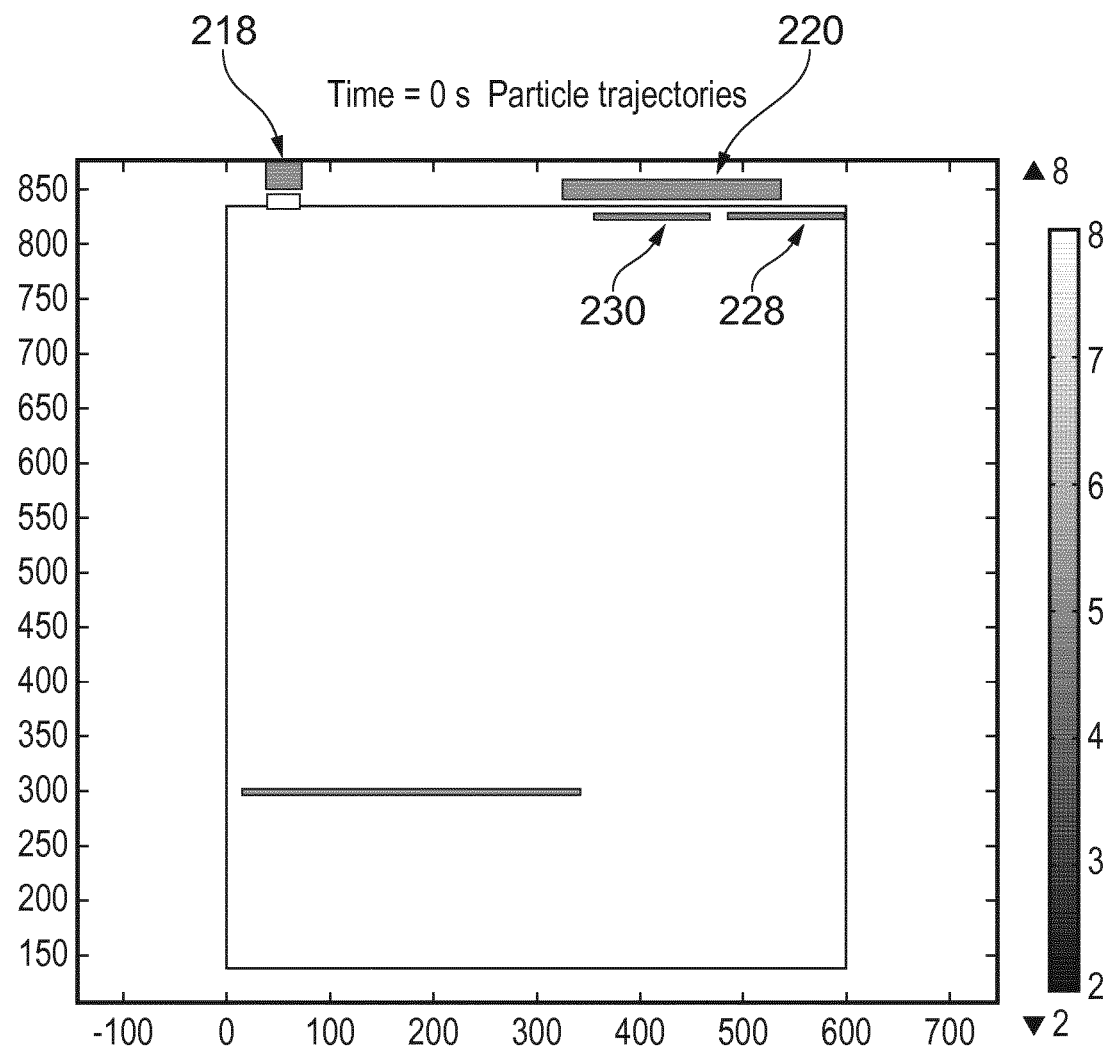
FIGS. 21-24 show particle trajectories for the device of FIGS. 18-20.
Figure 22:
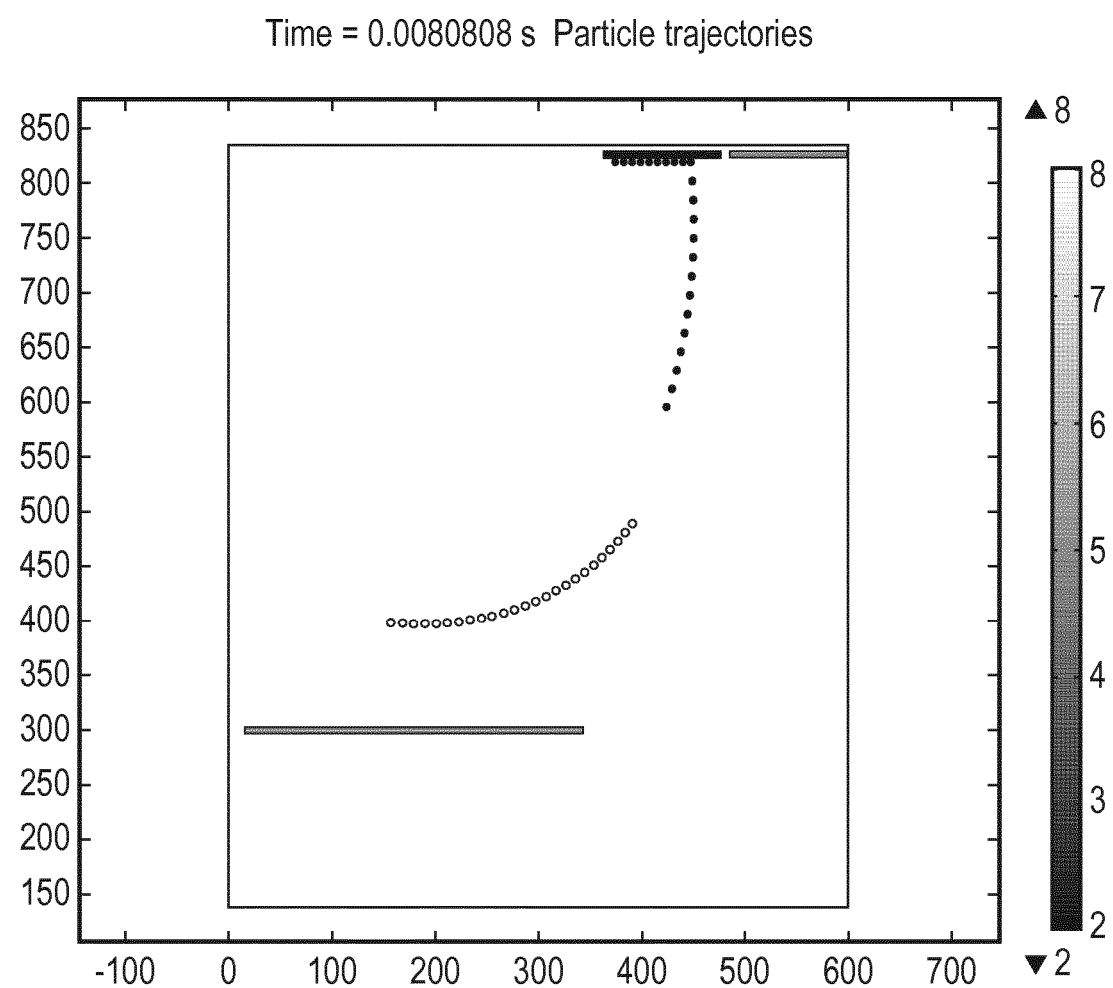
Figure 23:
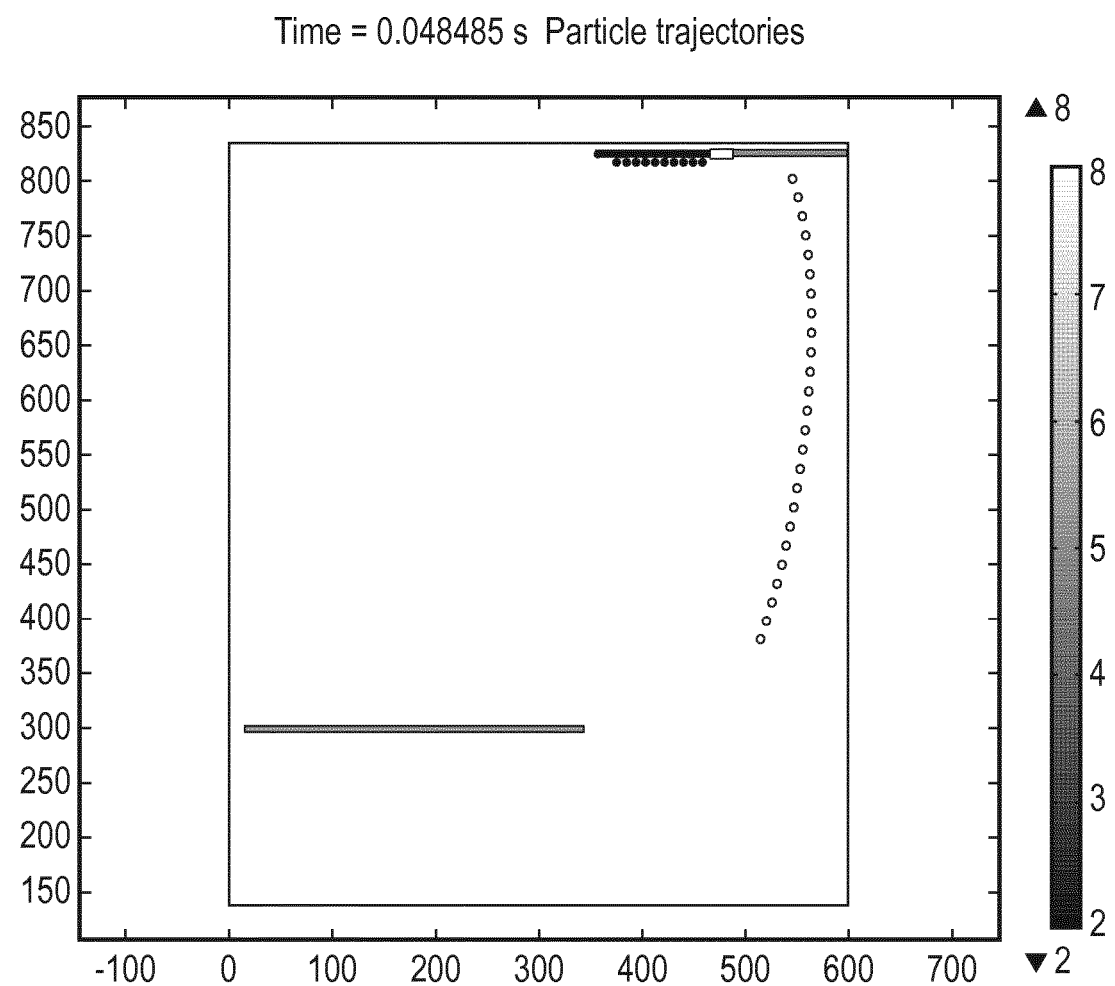
Figure 24:
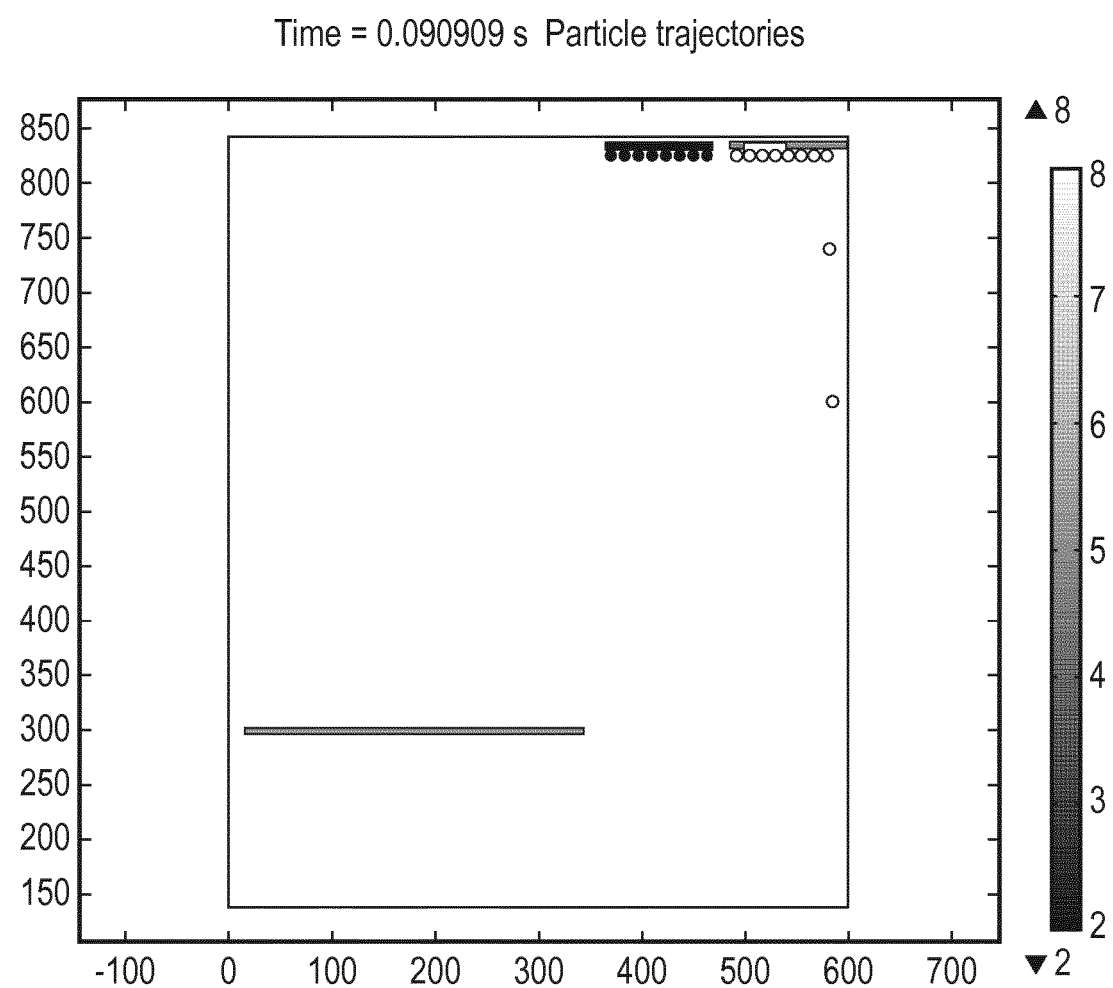

The particle trajectories for the device of FIGS. 18-20 are shown in FIGS. 21-24. What is illustrated are the modelled trajectories of a sequence of PM2.5 particles (black) introduced in a gas flow flowing into the inlet 218. Subsequently, a sequence of PM10 particles (white) is introduced in the gas flow flowing into the inlet 218. FIG. 21 shows the device at time t=0. FIGS. 22, 23 and 24 show subsequent times. As can be seen, the PM2.5 particles are deflected more than the PM10 particles. The PM2.5 particles therefore are intercepted by the PM2.5 sensor, which is upstream of the PM10 sensor.

This embodiment is therefore also different to the embodiments of FIGS. 1-3, in that the intercepted particles are the PM2.5 particles. However, the operating principle of the embodiment is the same, in that the thermophoretic effect is used to deviate the trajectories of the PM2.5 particles more than the PM10 particles.

As will be understood, substantially the same steps shown in FIGS. 14-17 can be used in a fabrication process for the embodiment of FIGS. 18-20. Those steps will therefore not be described again here.

A further embodiment is now described, with reference to FIGS. 25-38. This further embodiment differs to the previous two embodiments in that the heater and the sensors are located on the same plane of the wafer. This requires a trade-off in size, but this also provides an advantage because as the particles travel further along after thermophoretic impulse, their inertia becomes sufficient to deposit them separately.

Figure 25:
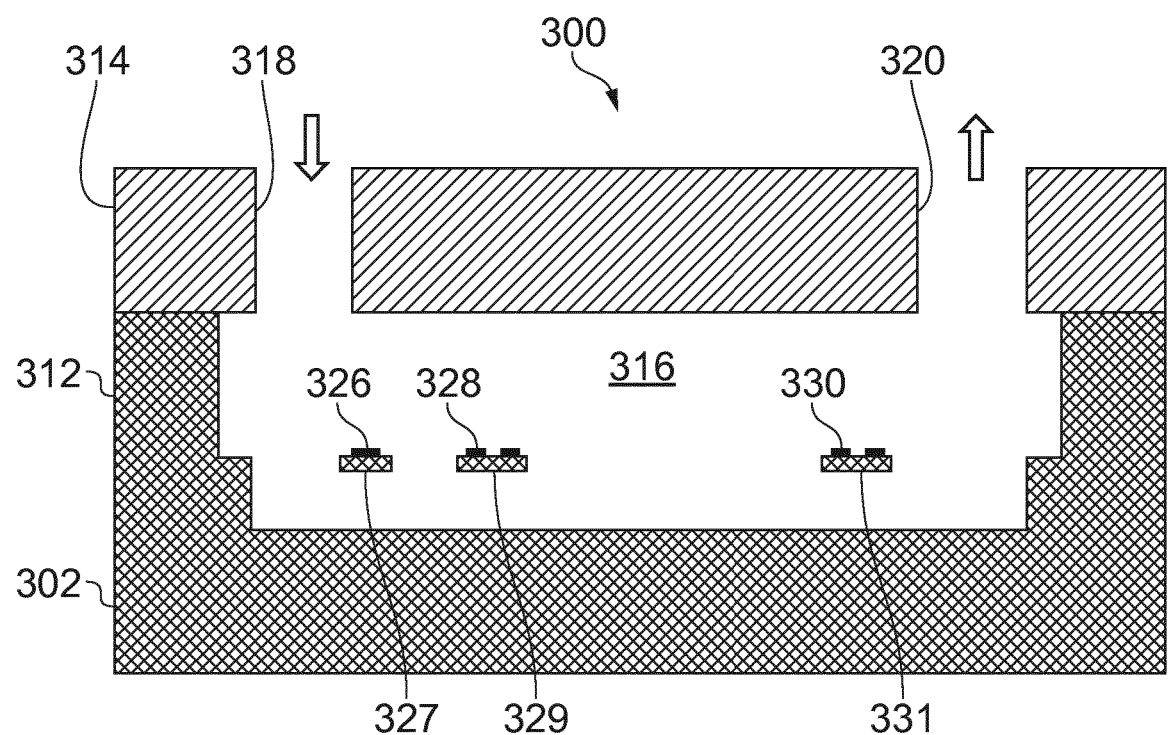
FIG. 25 shows a vertical plane longitudinal cross sectional view through a MEMS-based particle sensing device according to an embodiment of the invention.

FIG. 25 shows a vertical plane longitudinal cross-sectional view through a MEMS-based particle sensing device 300 according to an embodiment of the invention. Top wafer 314 provides gas flow inlet 318 and gas flow outlet 320. The device has sidewalls 312 and bottom wafer 302, together with the top wafer 314 defining a chamber 316. Gas is supplied to inlet 318 via and inlet pump (not shown). Gas is extracted from the outlet 320 via an outlet pump (not shown).

In view of the location of the inlet 318 and the outlet 320, there is defined a flow direction for gas longitudinally (or generally longitudinally) along the chamber 316.

Heater 326 is located on a suspended heater beam 327, above inlet 318. PM10 sensor 328 is located on a suspended beam 329 downstream of the heater. PM2.5 sensor 330 is located on a suspended beam 331 downstream of the PM10 sensor. In the drawing, PM10 sensor 328 is located closer to the inlet than to the outlet. PM2.5 sensor 330 is located closer to the outlet 320 than to the inlet.

Figure 26:
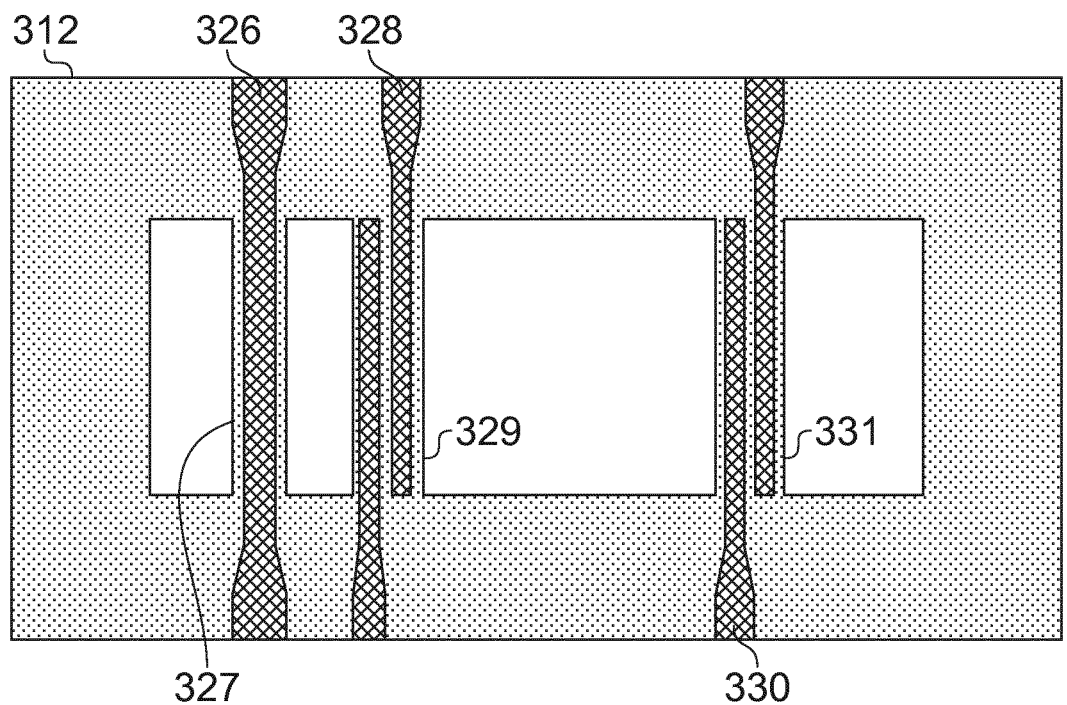
FIG. 26 shows the device of FIG. 25 but in a horizontal plane longitudinal cross section.

FIG. 26 shows the device of FIG. 25 but in a horizontal plane longitudinal cross section. through the side walls 312 and showing the beams 327, 329 and 331 and the heater 326 and PM10 sensor 328 and PM2.5 sensor 330 respectively formed on the beams. The PM sensors have an arrangement of coplanar interdigitated electrodes (shown only schematically but similar in operating principles to the embodiments shown in FIGS. 1-3). The PM sensors are suitable for sensing the arrival of particulate matter (PM) by the arriving PM affecting the capacitance between the coplanar interdigitated electrodes.

The bottom wafer is a silicon wafer. The heater 326 is located closer to the bottom wafer 302 than the top wafer 314. There is a pressure difference between the inlet 318 and outlet 320 which allows for a laminar flow along streamlines from inlet to outlet. The particles are also subject to drag force as well as gravity. Also because of the laminar flow, there is a pressure gradient in the sensor that also attempts to pull/push (depending on flow direction) particles through inertia forces. As would be expected, after thermophoretic force impact, the larger particles (PM10) show lower deviation and are therefore not deviated sufficiently to reach the outlet end of the device.

The embodiment shown in FIGS. 25 and 26 is a downward flow option, similar in some respects to the embodiment of FIG. 18.

Figure 27:
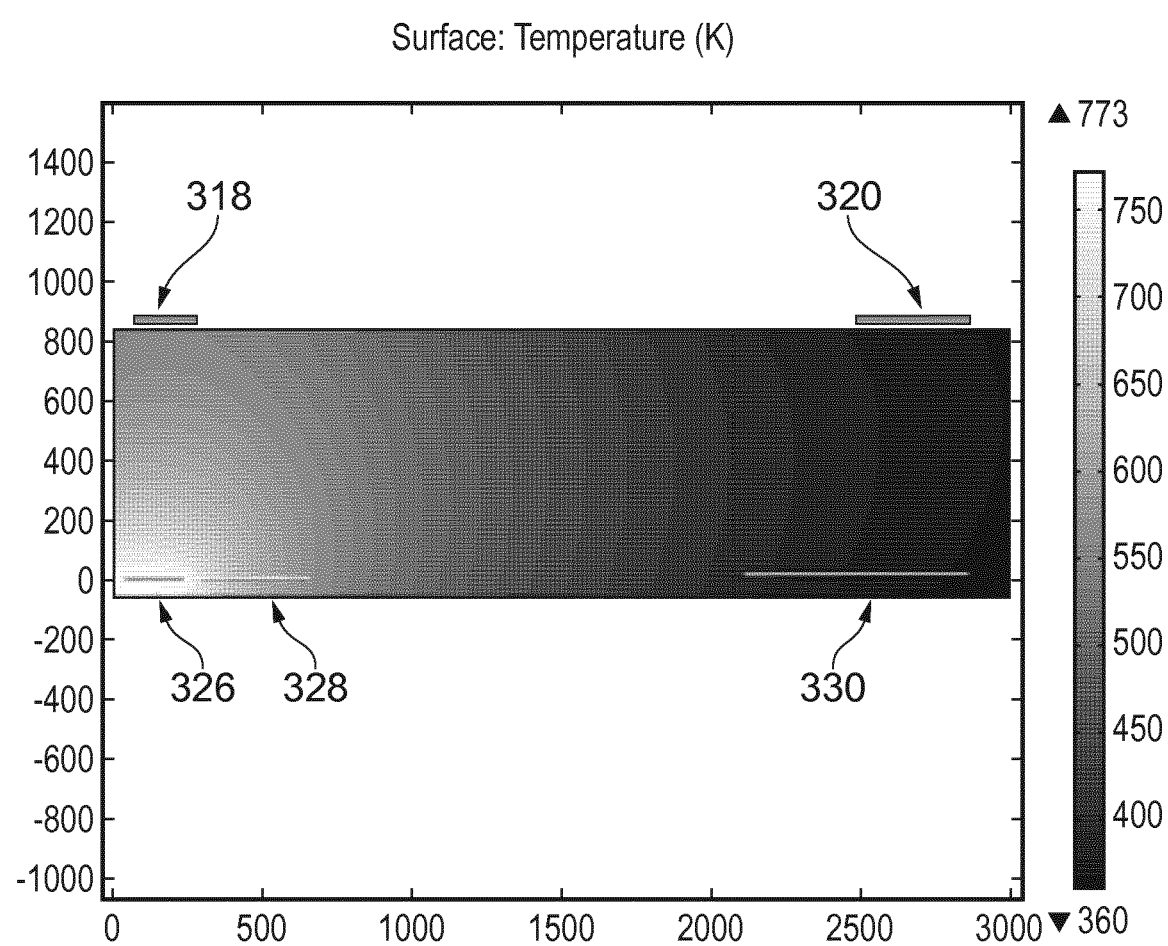
FIG. 27 illustrates a modelled temperature distribution for the embodiment of FIGS. 25 and 26.

FIG. 27 illustrates a modelled temperature distribution for the embodiment of FIGS. 25 and 26. This distribution shows the surface temperature variation in the device. Note that the relative scale in different directions is different in FIG. 27 compared with FIGS. 25 and 26.

Figure 28:
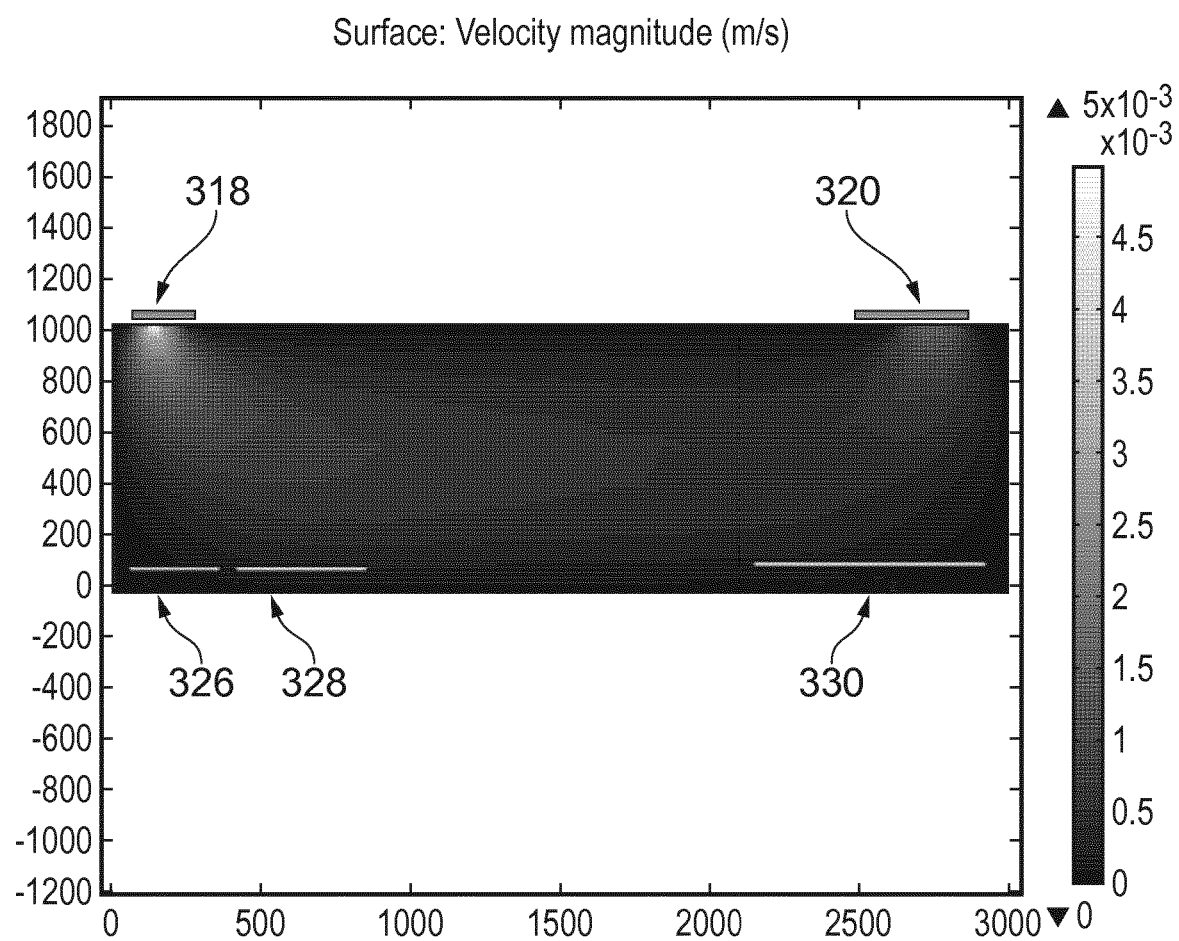
FIG. 28 shows a modelled velocity profile of carrier airflow through the device of FIG. 27.

FIG. 28 shows a modelled velocity profile of carrier airflow through the device of FIG. 27.

Figure 29:
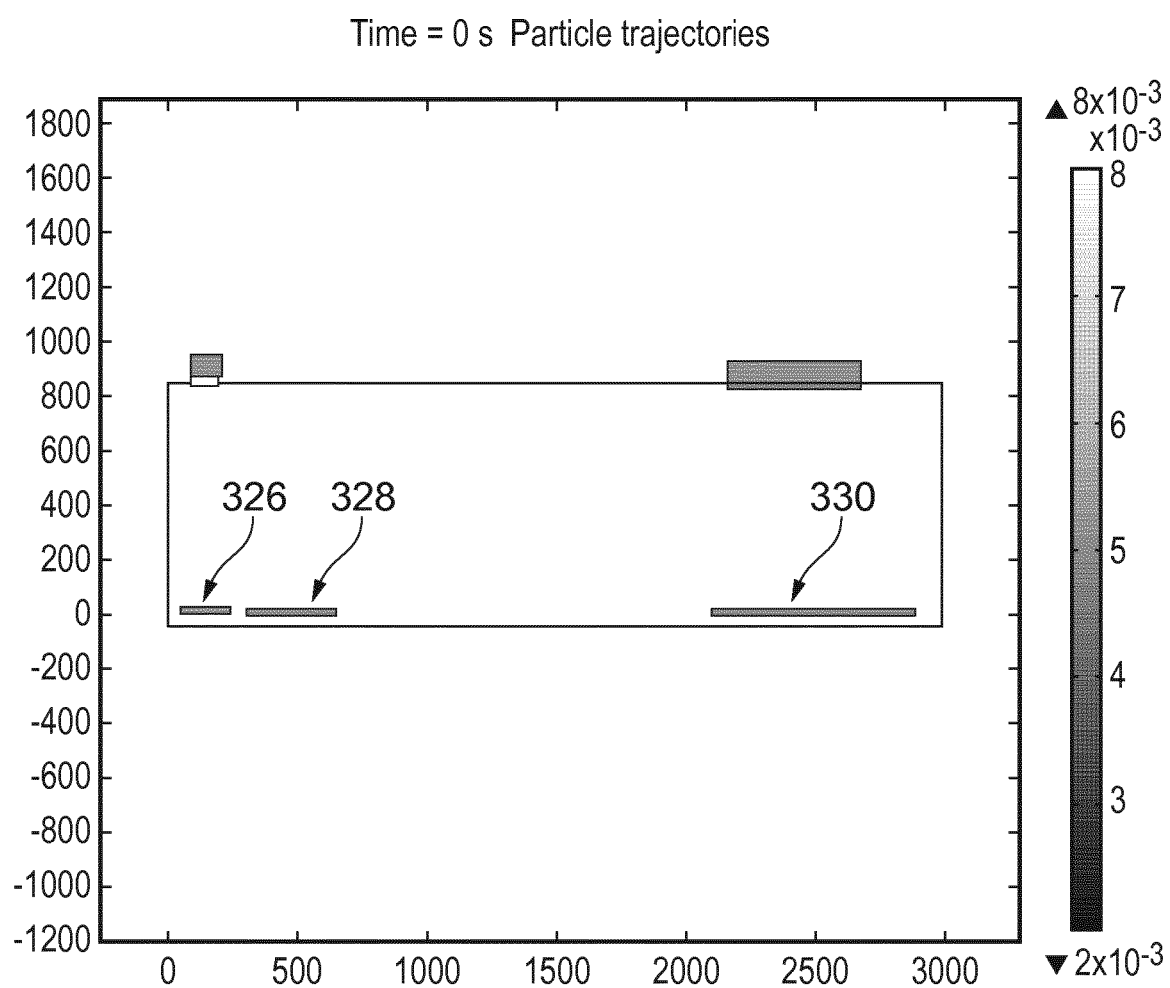
FIGS. 29-32 show particle trajectories for the device of FIGS. 25-28.
Figure 30:
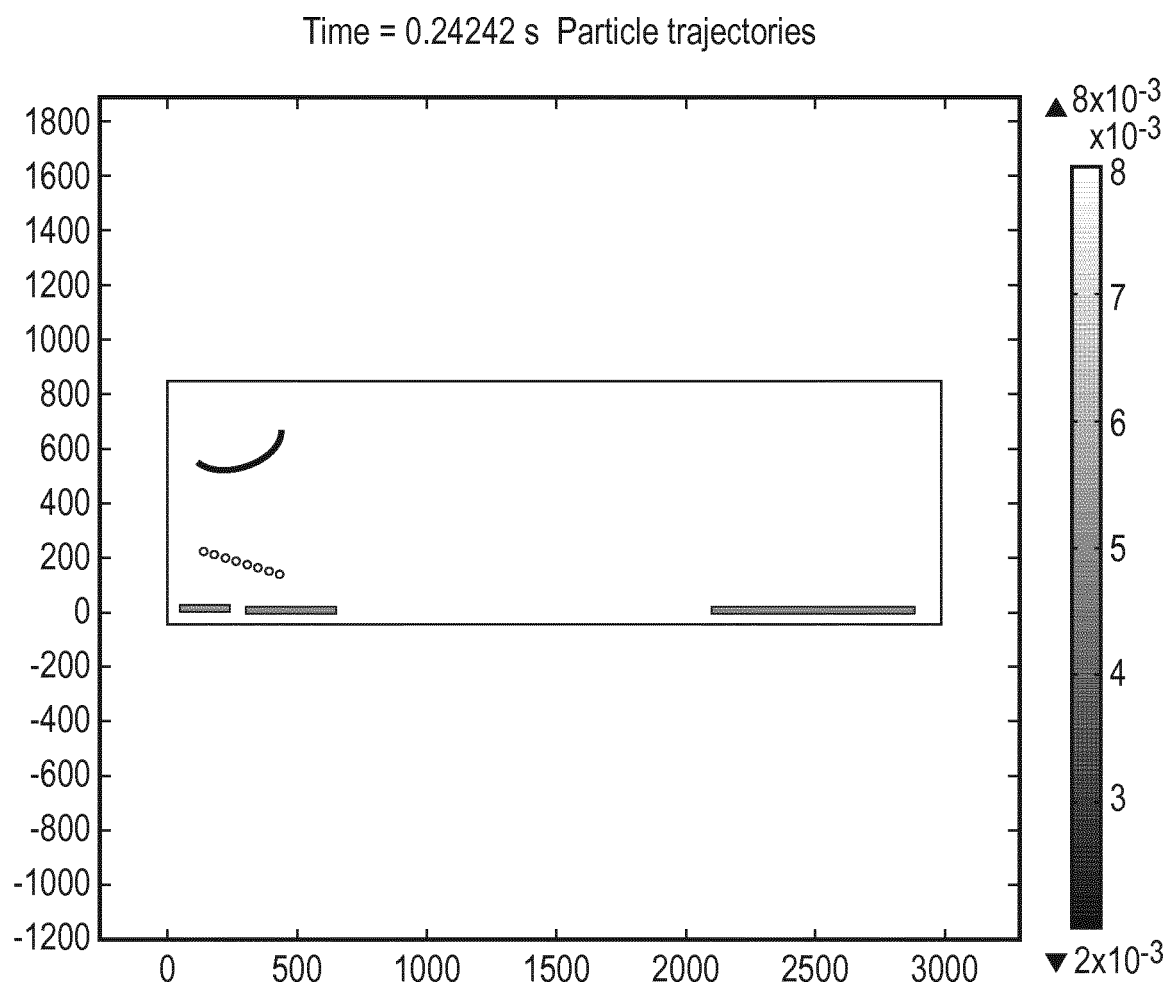
Figure 31:
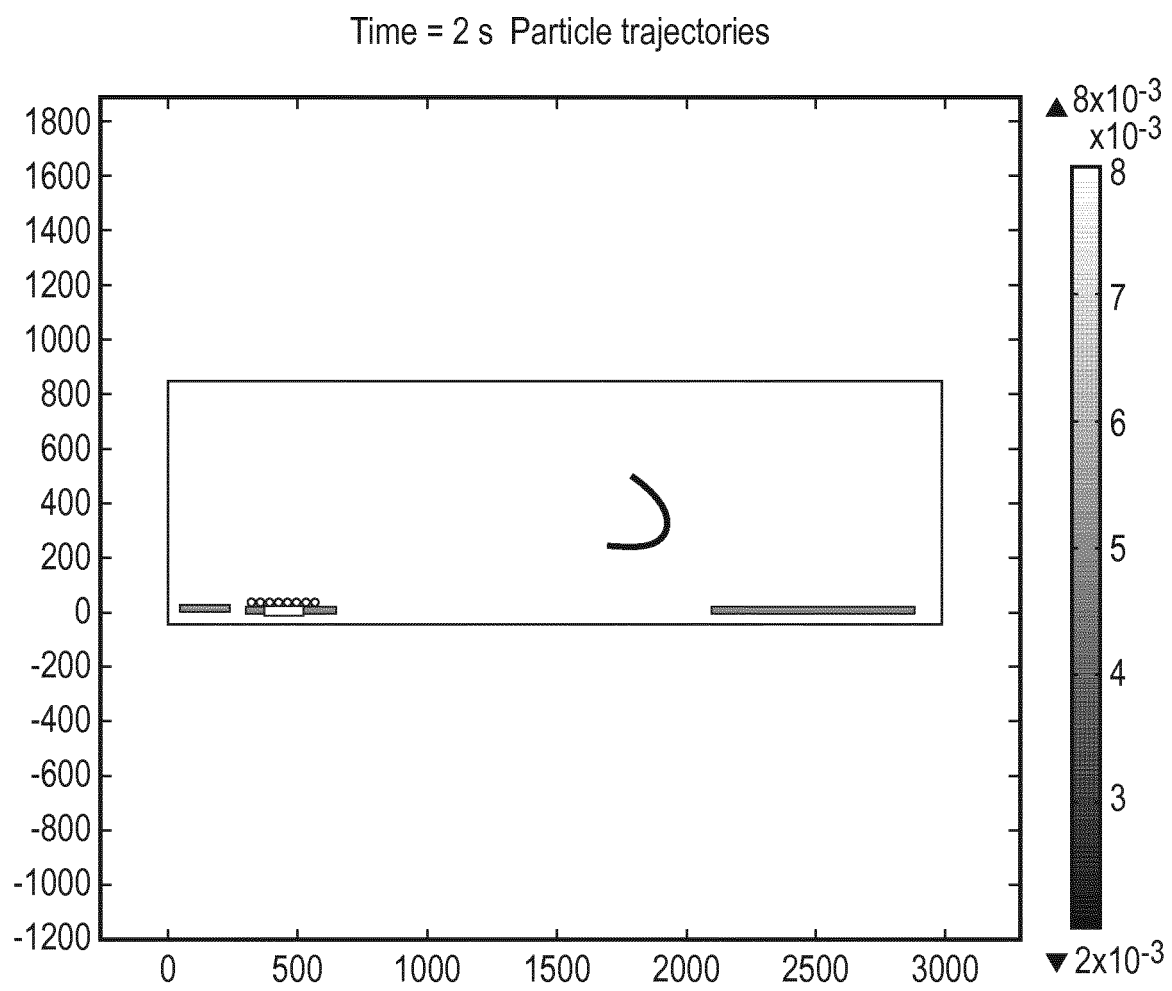
Figure 32:
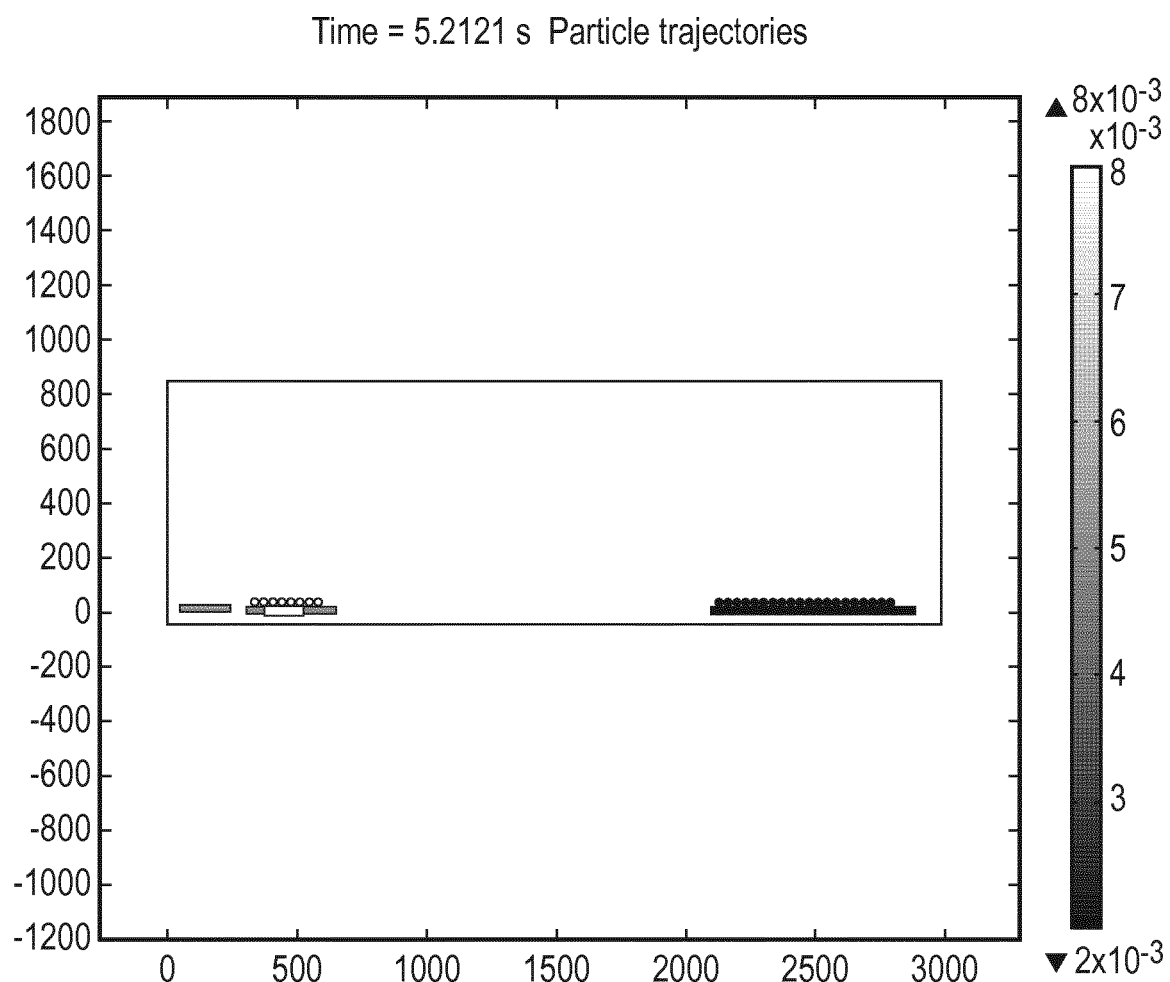

The particle trajectories for the device of FIGS. 25-28 are shown in FIGS. 29-32. What is illustrated are the modelled trajectories of a sequence of PM2.5 particles (black) introduced in a gas flow flowing into the inlet 318. Subsequently, a sequence of PM10 particles (white) is introduced in the gas flow flowing into the inlet 318. FIG. 29 shows the device at time t=0. FIGS. 30, 31 and 32 show subsequent times. As can be seen, the PM2.5 particles are deflected more than the PM10 particles. The PM10 particles therefore are intercepted by the PM10 sensor, which is upstream of the PM2.5 sensor.

Similarly to the embodiments of FIGS. 1-3, therefore, the intercepted particles are the PM10 particles.

FIGS. 33-38 show steps in a fabrication process for the embodiment of FIGS. 25-28.

Figure 33:
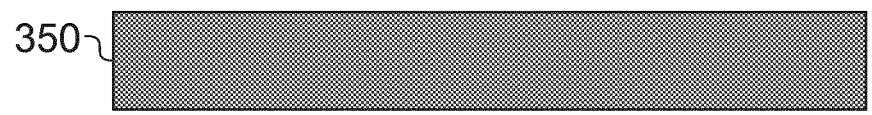
FIGS. 33-38 show steps in a fabrication process for the embodiment of FIGS. 25-28.
Figure 34:
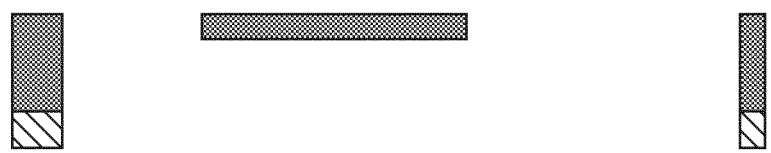
Figure 35:
Figure 36:
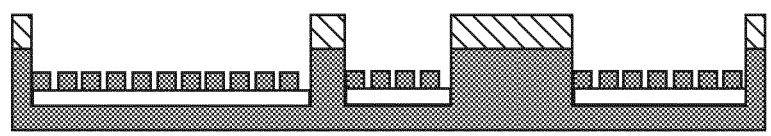

FIG. 33 shows a top wafer 350 and FIG. 35 shows a bottom wafer 351. Top wafer 350 is subjected to $SiO_2$ deposition, patterning and etching. A Si etch is carried out in order to obtain the inlet and outlet openings and to form the cross-sectional shape shown in FIG. 34.

For the bottom wafer 351, $SiO_2$ deposition, patterning and etching is carried out. A Si anisotropic etch is carried out in order to form the cross-sectional shape shown in FIG. 36. LSN deposition is carried out and then Ti/Pt, Ti/Au metallization and patterning via photolithography are performed in order to form the heater and associated beam, PM10 sensor and associated beam and PM2.5 sensor and associated beam.

Figure 37:
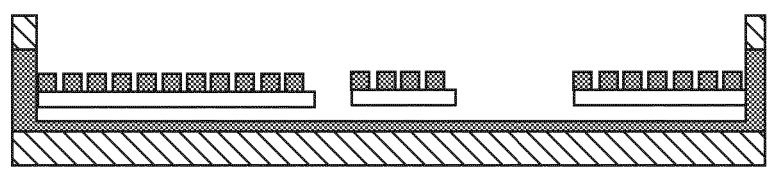

In FIG. 37, $SiO_2$ and Si etching are carried out, in order to release the beams under the heater and sensors.

Figure 38:
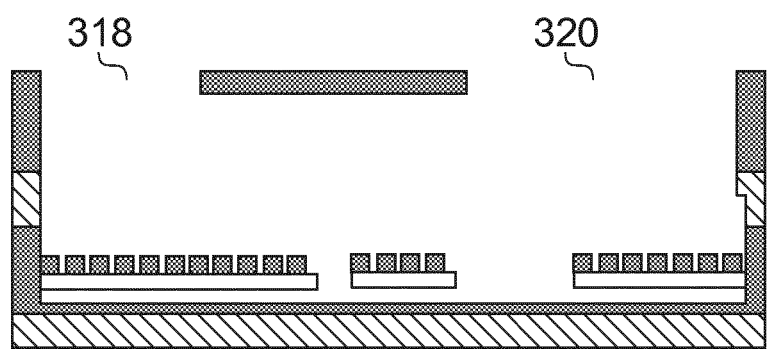

In FIG. 38, the bottom wafer 351 and top wafer 350 are bonded in order to enclose the chamber and form the device, the top wafer 350 incorporating the inlet 318 and outlet 320.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

NON-PATENT DOCUMENT REFERENCES

Anthony Seaton, William MacNee, Kenneth Donaldson, David Godden, "Particulate air pollution and acute health effects", Lancet, Vol. 345, pp 176-178. (1995)

Prashant Kumar, Lidia Morawska, Claudio Martani, George Biskos, Marina Neophytou, Silvana Di Sabatino, Margaret Bell, Leslie Norford, Rex Britter, "The rise of low-cost sensing for managing air pollution in cities", Environment International, Vol. 75, Pages 199-205. (2015)

Song Guo, Min Hu, Misti L. Zamora, Jianfei Peng, Dongjie Shang, Jing Zheng, Zhuofei Du, Zhijun Wu, Min Shao, Limin Zeng, Mario J. Molina, and Renyi Zhang, "Elucidating severe urban haze formation in China", Proceedings of the National Academy of Sciences of the United States of America, 111(49), Pages 17373-17378. (2014)

Grazia M. Marcazzan, Stefano Vaccaro, Gianluigi Valli, Roberta Vecchi, "Characterisation of PM10 and PM2.5 particulate matter in the ambient air of Milan (Italy)", Atmospheric Environment, Vol. 35, pp 4639{4650. (2001)

Xavier Querol, Andres Alastuey, Sergio Rodriguez, Felicia Plana, Carmen R. Ruiz, Nuria Cots, Guillem Massague, Oriol Puig, "PM10 and PM2.5 source apportionment in the Barcelona Metropolitan area, Catalonia, Spain", Atmospheric Environment, Vol. 35, pp 6407-6419. (2001)

David T. Suess and Kimberly A. Prather, "Mass Spectrometry of Aerosols", Chem. Rev., Vol. 99, pp 3007-3035. (1999)

M. Carminati, L. Pedala, E. Bianchi, F. Nason, G. Dubini, L. Cortelezzi, G. Ferrari, M. Sampietro, "Capacitive detection of micrometric airborne particulate matter for solid-state personal air quality monitors", Sensors and Actuators A, Vol. 219, pp 80-87. (2014)

Marco Carminati, Giorgio Ferrari, Filippo Guagliardo, Marco Sampietro, "ZeptoFarad capacitance detection with a miniaturized CMOS current front-end for nanoscale sensors", Sensors and Actuators A, Vol. 172, pp 117-123. (2011)

M. Carminati, G. Ferrari, F. Guagliardo, M. Sampietro, "ZeptoFarad resolution CMOS readout circuit for nanosensors", Procedia Engineering, Vol. 5, pp 1123-1126. (2010)

Xiaojian Yu, Mihai Esanu, Scott MacKay and Jie Chen, Mohamad Sawan, David Wishart and Wayne Hiebert, "An Impedance Detection Circuit for Applications in a Portable Biosensor System", International Symposium on Circuits and Systems (2016)

Jian Z. Chen, Anton A. Darhuber, Sandra M. Troian and Sigurd Wagner, "Capacitive sensing of droplets for microfluidic devices based on thermo-capillary actuation", Lab Chip, Vol. 4, pp 473-480. (2004)

The invention claimed is:

1. A particle sensing device for sensing particles entrained in a gas, the particle sensing device comprising:
   a sampling volume through which gas having entrained particles with a distribution of particle sizes including a first size range and a second size range, larger than or smaller than the first size range, is to be flowed;
   a thermophoretic impulse region arranged to apply a thermophoretic impulse to the entrained particles;
   a first sensing region, downstream of the thermophoretic impulse region, the first sensing region having a first sensor,
   wherein, in operation, the thermophoretic impulse, the flow of gas and gravity combine to cause at least some of the particles to follow respective trajectories within the sampling volume, the particle sensing device further comprising:
   an interception region, interposed between the thermophoretic impulse region and the first sensing region, the interception region having an interception unit located to intercept the respective trajectories of particles of the second size range but not respective trajectories of particles of the first size range,
   wherein the first sensor element is located to intercept the respective trajectories of particles of the first size range and to detect particles of the first size range, and the interception unit comprises a second sensor, capable of sensing the particles of the second size range.

2. The particle sensing device according to claim 1 wherein, in the distribution of particle sizes, the second size range is larger than the first size range.

3. The particle sensing device according to claim 1 wherein, in the distribution of particle sizes, the second size range is smaller than the first size range.

4. The particle sensing device according to claim 1 wherein, in operation, the thermophoretic impulse, the flow of gas and gravity combine to cause at least some of the particles to follow respective curved trajectories each having an apogee within the sampling volume.

5. The particle sensing device according to claim 1 wherein the first sensor is adapted to detect PM2.5.

6. The particle sensing device according to claim 1 wherein the first sensor senses the particles by capacitive detection.

7. The particle sensing device according to claim 1 wherein the first sensor has an arrangement of coplanar interdigitated electrodes.

8. The particle sensing device according to claim 1 wherein, in operation, the interception unit shadows the first sensor from particles of the second size range.

9. The particle sensing device according to claim 1 wherein the interception unit is oriented substantially perpendicular to the direction of gas flow, assessed as the direction of gas flow at the inlet and/or at the outlet.

10. The particle sensing device according to claim 1 wherein the second sensor is adapted to detect PM10.

11. The particle sensing device according to claim 1 wherein the second sensor senses the particles by capacitive detection.

12. The particle sensing device according to claim 1 wherein the second sensor has an arrangement of coplanar interdigitated electrodes.

13. The particle sensing device according to claim 1 wherein the first sensor is oriented substantially perpendicular to the direction of gas flow, assessed as the direction of gas flow at the inlet and/or at the outlet.

14. The particle sensing device according to claim 1 wherein the thermophoretic impulse region is provided with a heater.

15. The particle sensing device according to claim 1 wherein, when the device is held upright, the sampling volume is defined between a lower surface and an upper surface, the device further comprising an inlet to guide the gas flow into the sampling volume, the inlet being located:
   (i) closer to the lower surface than the upper surface of the sampling volume;
   (ii) through the lower surface; or
   (iii) through the upper surface.

16. The particle sensing device according to claim 15, the device further comprising an outlet for the gas flow to exit the sampling volume, the outlet being located:
   (a) where option (i) of claim 15 applies, further from the lower surface than the inlet is located from the lower surface;
   (b) where option (ii) of claim 15 applies through the lower surface; or
   (c) where option (iii) of claim 15 applies, through the upper surface.

17. The particle sensing device according to claim 1 wherein the sampling volume has a volume of at most 40000 mm$^3$.

18. A process for the manufacture of a particle sensing device for sensing particles entrained in a gas, the particle sensing device comprising:
   a sampling volume through which gas having entrained particles with a distribution of particle sizes including a first size range and a second size range, larger than or smaller than the first size range, is to be flowed;
   a thermophoretic impulse region arranged to apply a thermophoretic impulse to the entrained particles;
   a first sensing region, downstream of the thermophoretic impulse region, the first sensing region having a first sensor,
   wherein, in operation, the thermophoretic impulse, the flow of gas and gravity combine to cause at least some of the particles to follow respective trajectories within the sampling volume, the particle sensing device further comprising:
   an interception region, interposed between the thermophoretic impulse region and the first sensing region, the interception region having an interception unit located to intercept the respective trajectories of particles of the second size range but not respective trajectories of particles of the first size range,
   wherein the first sensor element is located to intercept the respective trajectories of particles of the first size range and to detect particles of the first size range, and the interception unit comprises a second sensor, capable of sensing the particles of the second size range, and
   wherein the process is a MEMS-based fabrication process.

19. The process according to claim 18 wherein the thermophoretic impulse region is provided with a heater, the heater formed on a beam suspended across the sampling volume.

20. The process according to claim 18 wherein the first sensor and/or second sensor are formed on respective beams suspended across the sampling volume.

21. A method of sensing particles entrained in a gas, the method including the steps:
   flowing gas having entrained particles with a distribution of particle sizes including a first size range and a second size range, larger than or smaller than the first size range, through a sampling volume;
   applying a thermophoretic impulse to the entrained particles at a thermophoretic impulse region so that the thermophoretic impulse, the flow of gas and gravity combine to cause at least some of the particles to follow respective trajectories within the sampling volume;
   detecting particles of the first size range at a first sensor element located to intercept the respective trajectories of particles of the first size range at a first sensing region, downstream of the thermophoretic impulse region; and
   intercepting the respective trajectories of particles of the second size range but not respective trajectories of particles of the first size range at an interception unit located in an interception region, interposed between the thermophoretic impulse region and the first sensing region, and
   wherein the interception unit comprises a second sensor, capable of sensing the particles of the second size range.

* * * * *